US009392166B2

(12) United States Patent
Ovsiannikov et al.

(10) Patent No.: US 9,392,166 B2
(45) Date of Patent: Jul. 12, 2016

(54) SUPER-RESOLUTION IN PROCESSING IMAGES SUCH AS FROM MULTI-LAYER SENSORS

(71) Applicants: Ilia Ovsiannikov, Studio City, CA (US); Lilong Shi, Pasadena, CA (US)

(72) Inventors: Ilia Ovsiannikov, Studio City, CA (US); Lilong Shi, Pasadena, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 121 days.

(21) Appl. No.: 14/191,417

(22) Filed: Feb. 26, 2014

(65) Prior Publication Data
US 2015/0116545 A1 Apr. 30, 2015

Related U.S. Application Data

(60) Provisional application No. 61/897,773, filed on Oct. 30, 2013.

(51) Int. Cl.
H04N 5/232 (2006.01)
H04N 5/335 (2011.01)
G06T 3/40 (2006.01)

(52) U.S. Cl.
CPC .......... H04N 5/23235 (2013.01); G06T 3/4053 (2013.01); H04N 5/335 (2013.01)

(58) Field of Classification Search
CPC ... G06T 3/4053; H04N 5/23235; H04N 5/335
See application file for complete search history.

(56) References Cited

U.S. PATENT DOCUMENTS

| 6,137,100 | A | 10/2000 | Fossum et al. |
| 6,466,618 | B1 | 10/2002 | Messing et al. |
| 6,754,397 | B1* | 6/2004 | Westerman ............... G06T 3/40 382/260 |
| 6,841,816 | B2 | 1/2005 | Merrill et al. |

(Continued)

FOREIGN PATENT DOCUMENTS

| EP | 1341234 B1 | 9/2003 |
| GB | 2488769 | 9/2012 |

(Continued)

OTHER PUBLICATIONS

B. C. de Lavarene et al., "Practical Implementation of LMMSE Demosaicing Using Luminance and Chrominance Spaces," Computer Vision and Image Understanding 107(1-2): 3-13 (2007).

(Continued)

*Primary Examiner* — Mekonnen Dagnew
(74) *Attorney, Agent, or Firm* — Renaissance IP Law Group LLP

(57) ABSTRACT

Pixels of an array capture values for an input image. The captured values correspond to pixel center points of the pixels that captured the values. Additional values about the input image may be further computed from the captured values. These additional values may correspond to additional center points, which can be different from any of the pixel center points. An output image may be constructed from the captured values plus the additional values. These values may be stored together and/or displayed together as the output image. Embodiments are applicable to images such as from multi-layer sensors. Since the output image can be created from a higher total number of values than those captured by the available number of pixels, such image processing can be called super-resolution, and can be applied to image processing within imaging devices, for still pictures, video and motion pictures, and so on.

23 Claims, 29 Drawing Sheets

IMAGING DEVICE

(56) References Cited

U.S. PATENT DOCUMENTS

| | | |
|---|---|---|
| 6,940,061 B2 | 9/2005 | Baharav et al. |
| 7,856,154 B2 | 12/2010 | Young |
| 8,054,355 B2 | 11/2011 | Mccarten et al. |
| 8,178,938 B2 | 5/2012 | Guidash |
| 8,446,497 B2 | 5/2013 | Hu |
| 8,730,359 B2 | 5/2014 | Sharman et al. |
| 2007/0012955 A1 | 1/2007 | Ihama |
| 2010/0097514 A1 | 4/2010 | McCarten et al. |
| 2010/0123070 A1 | 5/2010 | Natori |
| 2011/0062341 A1 | 3/2011 | Wever et al. |
| 2011/0090242 A1 | 4/2011 | Frederiksen et al. |
| 2011/0122308 A1 | 5/2011 | Duparre |
| 2012/0093436 A1* | 4/2012 | Habuka ............... H04N 1/3876 382/284 |
| 2012/0314093 A1* | 12/2012 | Tamayama ............ G06T 5/003 348/208.1 |
| 2013/0128087 A1* | 5/2013 | Georgiev ............. H04N 5/2254 348/307 |
| 2014/0327061 A1 | 11/2014 | Lee |

FOREIGN PATENT DOCUMENTS

| | | |
|---|---|---|
| JP | 2006228939 | 8/2006 |
| WO | 2005119791 A1 | 12/2005 |
| WO | 2012028847 A | 3/2012 |
| WO | 2013073796 A2 | 5/2013 |

OTHER PUBLICATIONS

D. Alleysson et al., Sep. 2008. "Linear Minimum Mean Square Error Demosaicking", CRC Press, Ch. 8, pp. 213-237.

Go, Jinwook et al., "Interpolation Using Neural Networks for Digital Still Cameras," IEEE Transactions on Consumer Electronics, vol. 46, No. 3, Aug. 2000, pp. 610-616.

Li, Xin et al., "Image Demosaicing: A Systematic Survey," Proceedings of SPIE-IS&T, vol. 6822, Jan. 27, 2008, pp. 68221J-1-68221J-15.

\* cited by examiner

*IMAGING DEVICE*

*DETAIL OF SAMPLE PIXEL ARRAY
WITH ADDITIONAL CHOSEN LOCATIONS
FOR ADDITIONAL COMPUTED VALUES*

400

| 410 | RECEIVE, FOR INPUT IMAGE, CAPTURED VALUES THAT CORRESPOND TO PIXEL CENTER POINTS |

↓

| 430 | COMPUTE ADDITIONAL VALUES ABOUT INPUT IMAGE, WHICH CORRESPOND TO ADDITIONAL CENTER POINTS |

↓

| 440 | CAUSE CAPTURED VALUES AND ADDITIONAL VALUES TO BE STORED |

↓

| 450 | CAUSE OUTPUT IMAGE TO BE DISPLAYED, THE OUTPUT IMAGE CONSTRUCTED FROM BOTH CAPTURED VALUES & ADDITIONAL VALUES |

FIG. 4     *METHODS*

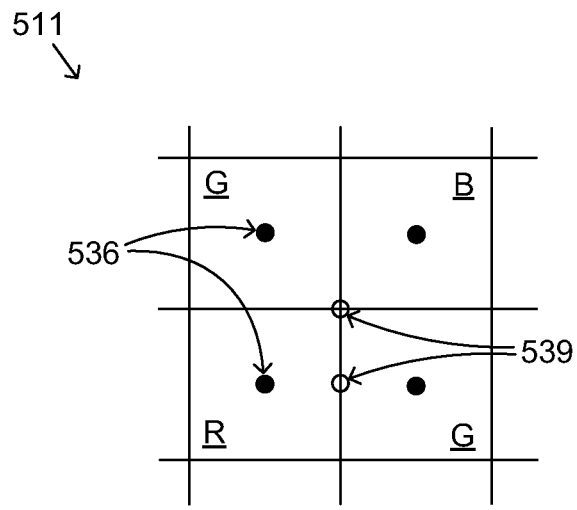
FIG. 5  *SUPER-RESOLUTION IN BAYER*
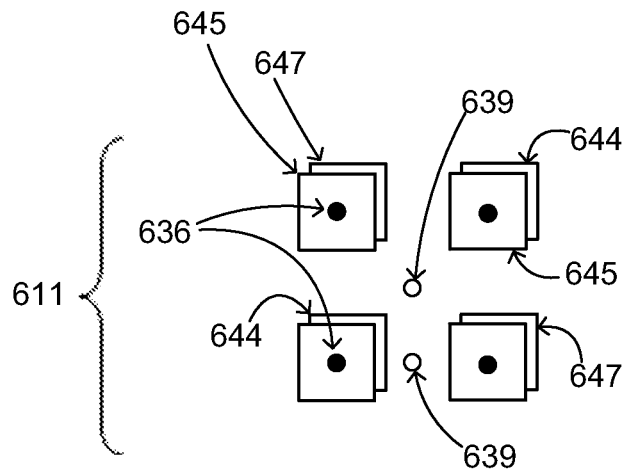
FIG. 6  *SUPER-RESOLUTION IN 2-LAYER STACKED PIXELS (NO OFFSET)*

**SUPER-RESOLUTION
IN 3-LAYER STACKED PIXELS
(NO OFFSET)**

SUPER-RESOLUTION
IN 2-LAYER STACKED PIXELS
WITH OFFSET

SUPER-RESOLUTION
IN 2-LAYER STACKED PIXELS
WITH OFFSET

SUPER-RESOLUTION
IN 3-LAYER STACKED PIXELS
WITH OFFSET

**SUPER-RESOLUTION
IN 3-LAYER STACKED PIXELS
WITH OFFSET**

SUPER-RESOLUTION
IN 3-LAYER STACKED PIXELS
WITH OFFSET

SYSTEM FOR IMAGING DEVICE

FIG. 14    PIXEL LAYER LOCATION GRID

PHYSICAL SAMPLING GRID

SAMPLE IMAGE
CONSTRUCTION GRID

*TILE IDENTIFICATION*

*TILE IDENTIFICATION*

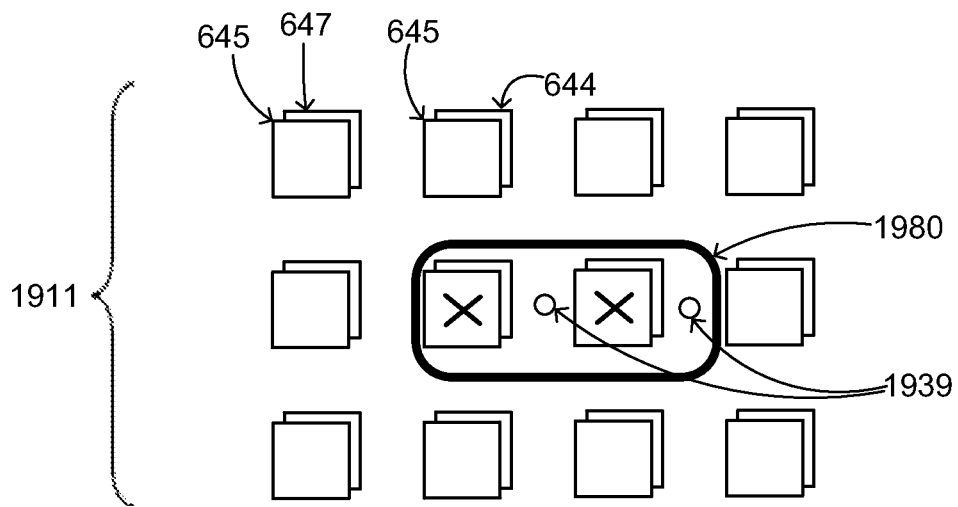
FIG. 19  TILE IDENTIFICATION
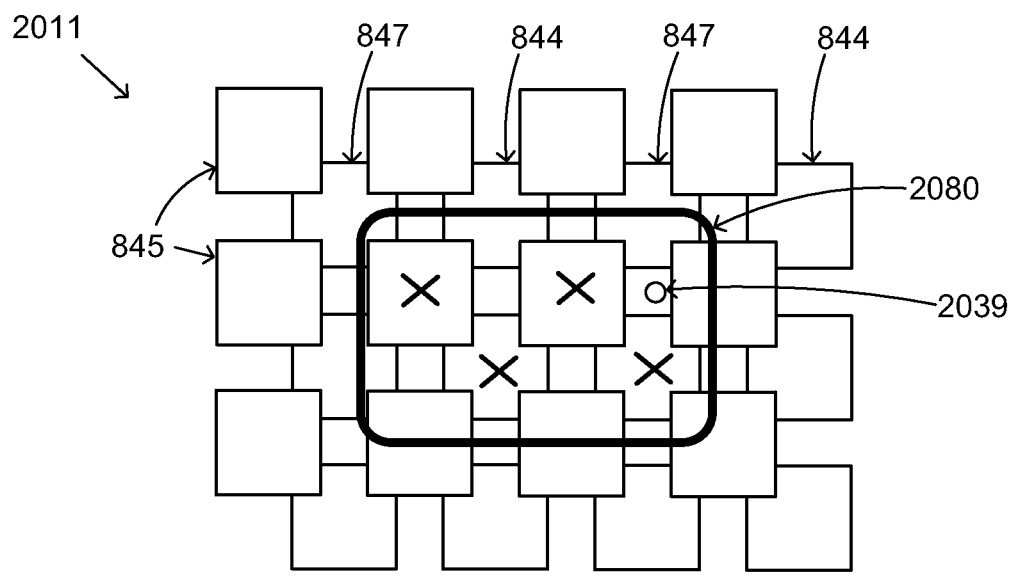
FIG. 20  TILE IDENTIFICATION $$R_{i,j,p} = \sum_{l=1}^{L} H_{p,l}{}^{R} \cdot X_{i,j,p,l}$$

$$G_{i,j,p} = \sum_{l=1}^{L} H_{p,l}{}^{G} \cdot X_{i,j,p,l}$$

$$B_{i,j,p} = \sum_{l=1}^{L} H_{p,l}{}^{B} \cdot X_{i,j,p,l}$$

FIG. 24

$$Y_{i,j,p} = \sum_{l=1}^{L} H_{p,l}{}^{Y} \cdot X_{i,j,p,l}$$

$$C_{i,j,p}{}^{R} = \sum_{l=1}^{L} H_{p,l}{}^{CR} \cdot C_{i,j,p,l}$$

$$C_{i,j,p}{}^{G} = \sum_{l=1}^{L} H_{p,l}{}^{CG} \cdot C_{i,j,p,l}$$

$$C_{i,j,p}{}^{B} = \sum_{l=1}^{L} H_{p,l}{}^{CB} \cdot C_{i,j,p,l}$$

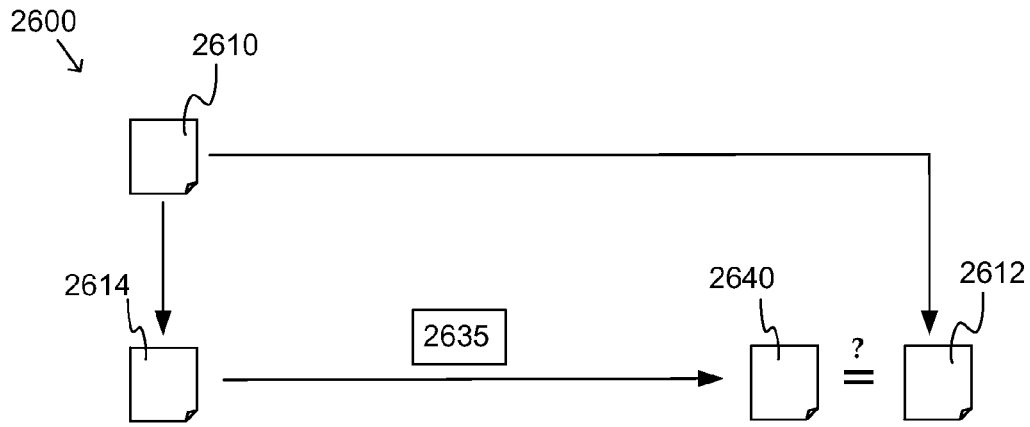
FIG. 26  *FILTER TRAINING*
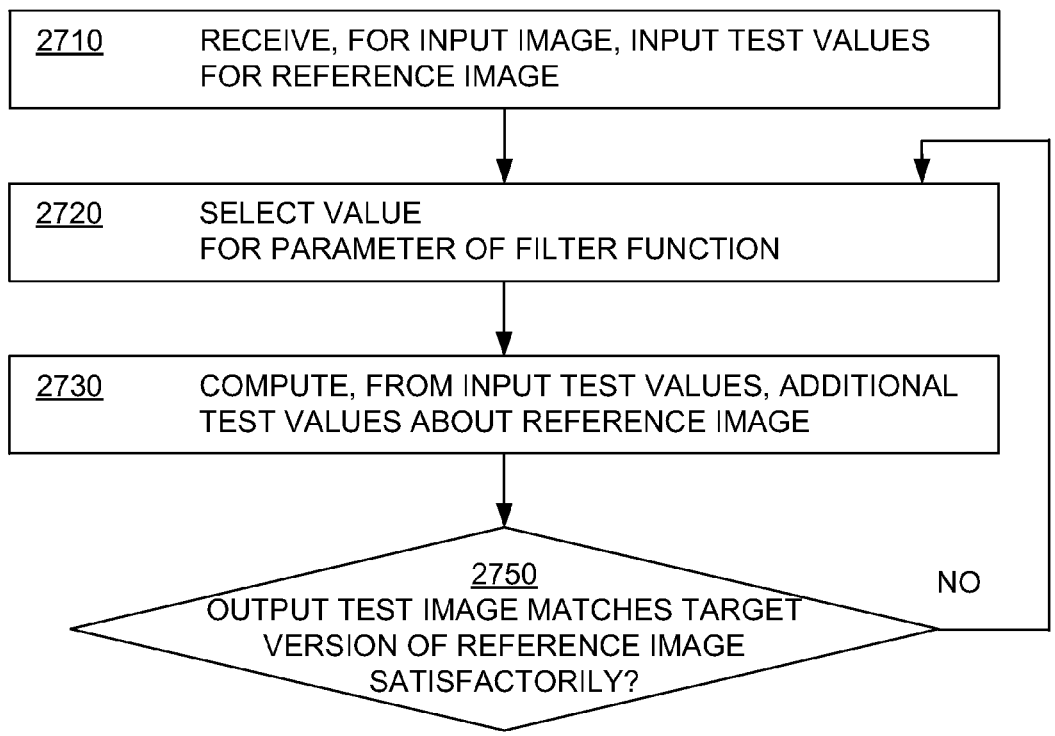
FIG. 27  *METHODS*

$$[H'^R_{p,1} \ldots H'^R_{p,L}] \cdot \begin{bmatrix} \begin{bmatrix} X_{1,1,1,1} \\ \vdots \\ X_{1,1,1,L} \end{bmatrix} \ldots \begin{bmatrix} X_{I,J,P,1} \\ \vdots \\ X_{I,J,P,L} \end{bmatrix} \end{bmatrix} = [R_{1,1,1}{}^* \ldots R_{I,J,P}{}^*]$$

$$[H'^G_{p,1} \ldots H'^G_{p,L}] \cdot \begin{bmatrix} \begin{bmatrix} X_{1,1,1,1} \\ \vdots \\ X_{1,1,1,L} \end{bmatrix} \ldots \begin{bmatrix} X_{I,J,P,1} \\ \vdots \\ X_{I,J,P,L} \end{bmatrix} \end{bmatrix} = [G_{1,1,1}{}^* \ldots G_{I,J,P}{}^*]$$

$$[H'^B_{p,1} \ldots H'^B_{p,L}] \cdot \begin{bmatrix} \begin{bmatrix} X_{1,1,1,1} \\ \vdots \\ X_{1,1,1,L} \end{bmatrix} \ldots \begin{bmatrix} X_{I,J,P,1} \\ \vdots \\ X_{I,J,P,L} \end{bmatrix} \end{bmatrix} = [B_{1,1,1}{}^* \ldots B_{I,J,P}{}^*]$$

⏟ 2810

$$\underbrace{A \cdot B = C}_{2820} \qquad \underbrace{A = E[CB^T] \cdot E[BB^T]^{-1}}_{2830}$$

$$[H'{}^Y_{p,1} \ldots H'{}^Y_{p,L}] \cdot \left[ \begin{bmatrix} X_{1,1,1,1} \\ \vdots \\ X_{1,1,1,L} \end{bmatrix} \ldots \begin{bmatrix} X_{I,J,P,1} \\ \vdots \\ X_{I,J,P,L} \end{bmatrix} \right] = [Y_{1,1,1}{}^* \ldots Y_{I,J,P}{}^*]$$

FIG. 29B

$$Y_{i,j,p} = \sum_{l=1}^{L} \boldsymbol{H}_{p,l}{}^{Y} \cdot \boldsymbol{X}_{i,j,p,l}$$

$$[H'^{CR}_{p,1} \ldots H'^{CR}_{p,L}] \cdot \begin{bmatrix} \begin{bmatrix} C_{1,1,1,1} \\ \vdots \\ C_{1,1,1,L} \end{bmatrix} \ldots \begin{bmatrix} C_{I,J,P,1} \\ \vdots \\ C_{I,J,P,L} \end{bmatrix} \end{bmatrix} = [C^{R*}_{1,1,1} \ldots C^{R*}_{1,1,1}]$$

$$[H'^{CG}_{p,1} \ldots H'^{CG}_{p,L}] \cdot \begin{bmatrix} \begin{bmatrix} C_{1,1,1,1} \\ \vdots \\ C_{1,1,1,L} \end{bmatrix} \ldots \begin{bmatrix} C_{I,J,P,1} \\ \vdots \\ C_{I,J,P,L} \end{bmatrix} \end{bmatrix} = [C^{G*}_{1,1,1} \ldots C^{G*}_{1,1,1}]$$

$$[H'^{CB}_{p,1} \ldots H'^{CB}_{p,L}] \cdot \begin{bmatrix} \begin{bmatrix} C_{1,1,1,1} \\ \vdots \\ C_{1,1,1,L} \end{bmatrix} \ldots \begin{bmatrix} C_{I,J,P,1} \\ \vdots \\ C_{I,J,P,L} \end{bmatrix} \end{bmatrix} = [C^{B*}_{1,1,1} \ldots C^{B*}_{1,1,1}]$$

FIG. 29D

COMBINE WITH
ADDITIONAL OPERATIONS

SUPER-RESOLUTION IN PROCESSING IMAGES SUCH AS FROM MULTI-LAYER SENSORS

CROSS REFERENCE TO RELATED PATENT APPLICATIONS

This patent application claims priority from U.S. Provisional Patent Application Ser. No. 61/897,773, filed on Oct. 30, 2013, the disclosure of which is hereby incorporated by reference for all purposes.

BACKGROUND

Modern imaging devices use pixels to capture images. The pixels divide an input image in elements, and capture values for the elements of the image. These values for the image are captured by various techniques, such as numbers of electrons per pixel after a brief exposure time. The output image is typically constructed from the captured values, whether in color or in black and white.

BRIEF SUMMARY

The present description gives instances of devices, computers and methods, the use of which may help overcome problems and limitations of the prior art.

In some embodiments, pixels of an array may capture values for an input image. The captured values may correspond to pixel center points of the respective pixels that captured the values. One or more additional values about the input image may be further computed from the captured values. At least some of these additional values correspond to additional center points, which can be different from any of the pixel center points. An output image may be constructed from the captured values, together with the additional values. These values may be stored together and/or displayed together as the output image.

An advantage of embodiments arises from the fact that the output image can be created from a higher total number of values than those captured by the available number of pixels. Such image processing can be called super-resolution, and can be applied to image processing within imaging devices, for still pictures, video and motion pictures, and so on.

These and other features and advantages of this description will become more readily apparent from the following Detailed Description, which proceeds with reference to the drawings, in which:

BRIEF DESCRIPTION OF THE DRAWINGS

FIG. 4 is a flowchart illustrating methods according to embodiments.

FIG. 5 is a diagram of a tile of a possible single-layer sensor embodiment of the pixel array of FIG. 2.

FIG. 6 is a diagram of a tile pair of a possible two-layer stacked sensor array made according to embodiments.

FIG. 19 is a diagram showing a two-layer stacked sensor array portion, and further identifying sample tiles for locating additional center points for additional values according to embodiments.

FIG. 20 is a diagram showing a two-layer stacked offset sensor array portion, and further identifying a sample tile for locating additional center points for additional values according to embodiments.

FIG. 24 shows equations that can be used for computing R, G, B image values according to embodiments.

FIGS. 25A, 25B, 25C and 25D show equations that can be used for computing luminance and chrominance image values according to embodiments.

FIG. 26 is a diagram for describing filter training operations according to embodiments.

FIG. 27 is a flowchart for illustrating filter training methods according to embodiments.

FIG. 28 shows equations that can be used for training filters directly with RGB values according to embodiments.

FIGS. 29A, 29B, 29C, 29D show equations that can be used for training filters first by in luminance and chrominance values according to embodiments.

DETAILED DESCRIPTION

As has been mentioned, the present description is about devices, computers and methods that can perform certain types of image processing. Embodiments are now described in more detail.

Figure 1:
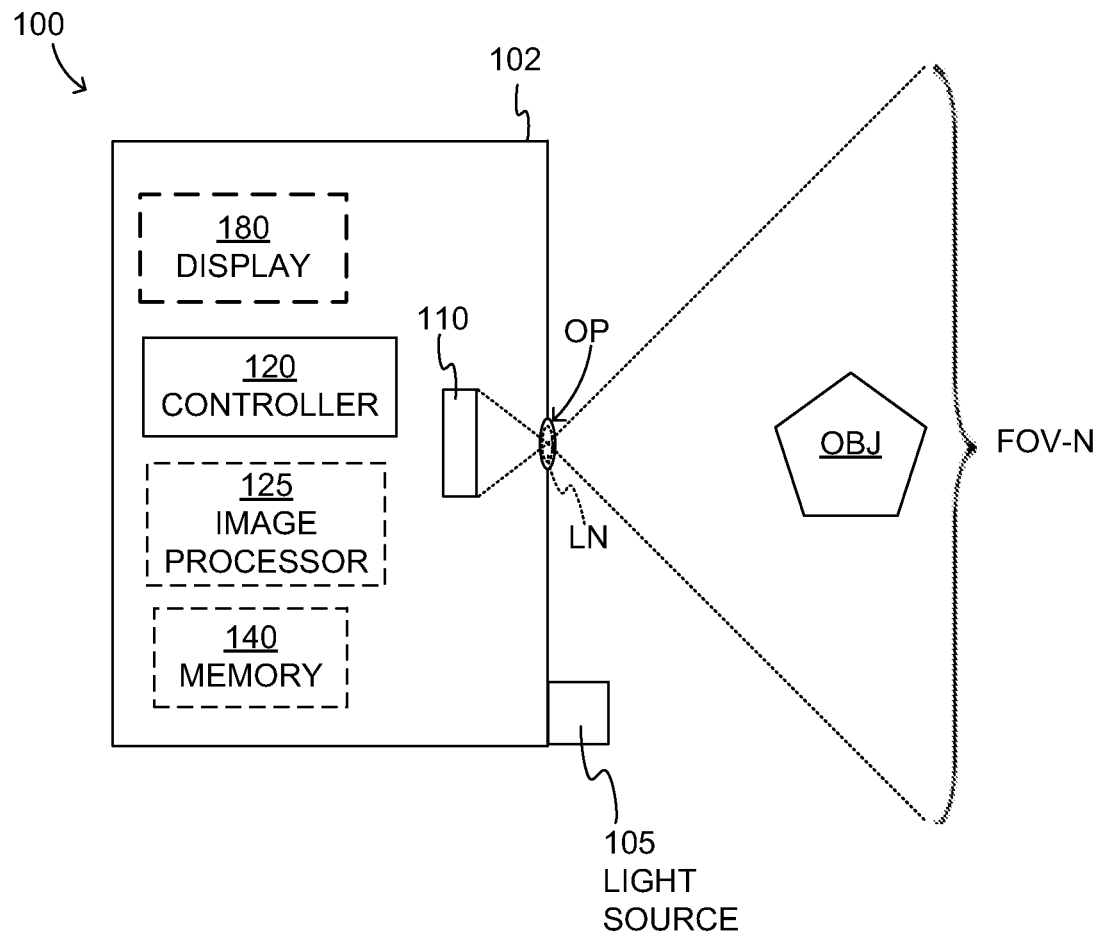
FIG. 1 is a block diagram of an imaging device made according to embodiments.

FIG. 1 is a block diagram of an imaging device 100 made according to embodiments. Imaging device 100 has a casing 102. A light source 105, such as an LED, may be provided on casing 102. An opening OP is provided in casing 102. A lens LN may be provided optionally at opening OP, although that is not necessary.

Imaging device 100 also has a pixel array 110 made according to embodiments. Pixel array 110 is configured to receive light through opening OP, so imaging device 100 can capture an image of an object OBJ, person, or scene. Sometimes, the image capture is assisted by light source 105. As can be seen, pixel array 110 and opening OP define a nominal Field of View FOV-N. Of course, Field of View FOV-N and object OBJ are in three dimensions, while FIG. 1 shows them in two dimensions. Further, if lens LN is indeed provided, the resulting actual field of view may be different than nominal Field of View FOV-N. Imaging device 100 is aligned so that object OBJ, person, or scene that is to be imaged is brought within the actual field of view.

The pixels of pixel array 110 can capture elements of the image. In many embodiments, pixel array 110 has a two-dimensional array of pixels. The array can be organized in rows and columns.

Device 100 can render the image from the elements captured by the pixels. Optionally, device 100 also includes a display 180, which can include a screen or a touchscreen that can display the rendered image, or a version of it.

Device 100 additionally includes a controller 120, for controlling the operation of pixel array 110 and other components of imaging device 100. Controller 120 may optionally be formed integrally with pixel array 110, and possibly also with other components of imaging device 100.

Device 100 may additionally include an image processor 125, for processing the input image according to embodiments. More particularly, image processor 125 may process captured values by the pixels of array 110 of the input image, to generate the values that constitute the output image. Image processor 125 may optionally be formed integrally with controller 120, pixel array 110, and/or other components of imaging device 100.

Device 100 may optionally include a memory 140. Memory 140 may store the input image, i.e. the values captured by the pixels of the array, for the respective elements of the input image. Memory 140 may further store aspects of the output image, e.g. values computed for the output image according to embodiments.

Figure 2:
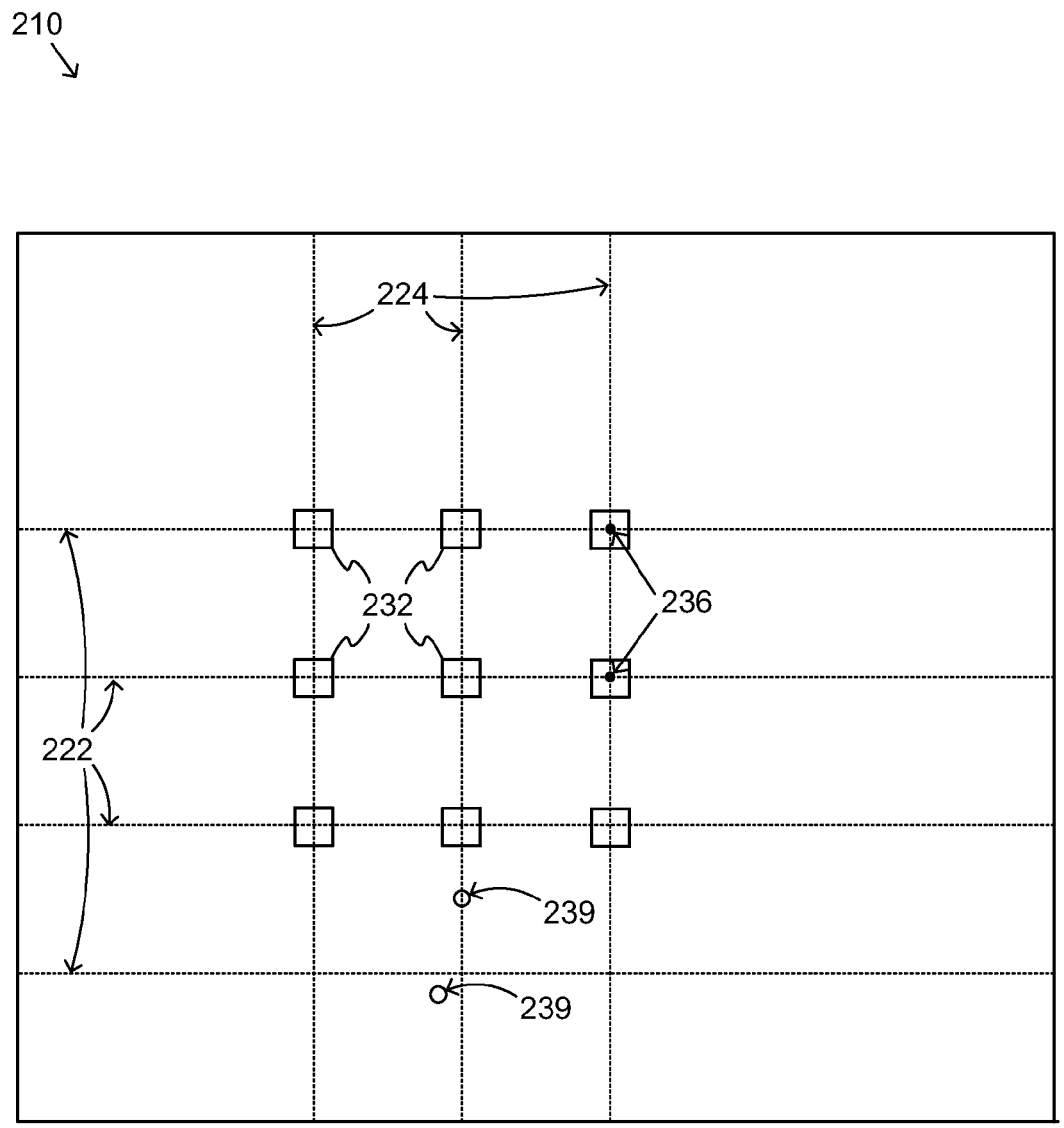
FIG. 2 is a diagram of a sample pixel array with additional sample chosen locations for computation of additional values, according to embodiments.

FIG. 2 is a diagram of a sample pixel array 210. Pixel array 210 has pixels 232, of which only a few are shown, and even fewer are indicated, for clarity. Pixels 232 can be made from inorganic material and/or organic material.

Pixels 232 are shown as squares, but that is only for purposes of depiction. In reality, pixels 232 can have different shapes, and their photosensitive area can be less than the area of the entire pixel. Accordingly, the photosensitive areas of pixels 232, taken together, do not necessarily cover the entire area of array 210. In fact, in some embodiments, elements of an input image that are imaged between the photosensitive areas of pixels 232 might not be imaged, which means that values for such elements might not be captured.

Pixels 232 are arranged in a rectangular pattern along rows 222 and columns 224, but that is only for purposes of example and not of limitation. As will be seen in other examples later in this document, there can be multiple patterns of arranging the pixels.

In FIG. 2, only one layer of pixels 232 is shown, but that is not necessarily the case. As will be seen in other examples later in this document, there can be multiple layers, such as two or more layers of pixels, which could be stacked. A pair of such layers can typically be characterized as a lower layer and an upper layer that is vertically stacked over the lower layer, whether there is an intervening layer or not.

Also, pixel center points 236 can be defined for pixels 232. More particularly, pixel center points 236 can be defined in a suitable, preferably consistent way, such as being at the center of the photosensitive areas of pixels 232. If these photosensitive areas, also called photo-sites, are rectangular, for example, the center can be found at the intersection of two diagonals of the photosensitive area. In this example, rows 222 and columns 224 were advantageously chosen such that pixel center points 236 are located at their intersections. For the mathematical purposes of constructing the output image, the values captured by pixels 232 may correspond to pixel center points 236 of the respective pixels 232 that captured them.

Moreover, in FIG. 2, additional center points 239 can be further chosen. In the example of FIG. 2, none of the shown additional center points 239 is at the intersections of rows 222 and columns 224, but that is not necessary.

As mentioned previously, in embodiments, additional values are computed for the output image, above and beyond the captured values. Such additional values may correspond to additional center points 239. Since additional center points 239 are not at the intersections of rows 222 and columns 224, these additional values may thus be for additional elements of the input image that may not have been captured by one of pixels 232. Therefore, when one of the additional values is computed for the input image according to embodiments, that additional value can be used to help construct a final output image above and beyond the values captured for the input image by physical pixels 232.

In FIG. 2 additional center points 236 are drawn as full dots, while additional center points 239 are drawn differently as circles. The difference is intended to help keep in mind that pixel center points 236 are defined for values that are captured by pixels 232, while additional center points 239 are defined for additional values that are computed. The output image may then have values for locations with the dots, and also for locations with the circles.

Beyond the example of FIG. 2, one or more of the chosen additional center points 239 could coincide with one of pixel center points 236. Such would be useful, for example, for correcting for a bad pixel.

As mentioned above, according to embodiments, additional values are computed that may correspond to the additional center points. More detailed examples of such computations are shown later in this document. Computation may take place by an image processor, such as image processor 125. Alternately the computation may be performed by a computer. An example is now described.

Figure 3:
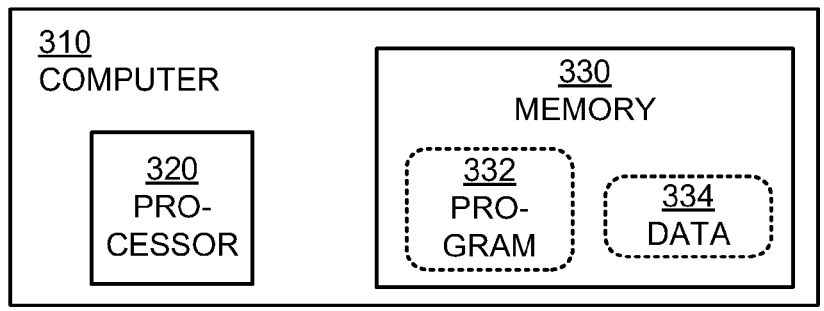
FIG. 3 is a diagram of a computer according to embodiments.

FIG. 3 is a diagram of a computer 310 according to embodiments. Computer 310 may be an embodiment that receives one or more input images, and generates output images. The input images may be unrelated, or related, such as those of a video or a moving picture.

Computer 310 may be implemented by one or more devices that include logic circuitry. Computer 310 may be a standalone device or computer, such as a general purpose computer, or part of a device that has one or more additional functions. The logic circuitry may include a processor 320 that may be programmable for a general purpose, or dedicated, such as a microcontroller, a microprocessor, a Digital Signal Processor (DSP), etc. The logic circuitry may also include storage media, such as a memory 330. Such media include but are not limited to volatile memory, non-volatile memory (NVM), read only memory (ROM); random access memory (RAM); magnetic disk storage media; optical storage media; smart cards, flash memory devices, etc. Any one of these storage media can be a non-transitory computer-readable medium. These storage media, individually or in combination with others, can have stored thereon data 334. In addition, these storage media may store programs 332 that processor 320 may be able to read, and execute. More particularly, programs 332 can include instructions in the form of code, which processor 320 may be able to execute upon reading. Executing is performed by physical manipulations of physical quantities, and may result in the functions, processes, actions and/or methods to be performed, and/or processor 320 to cause other devices or components or blocks to perform such functions, processes, actions and/or methods.

Returning to FIG. 1, if memory 140 is indeed provided, it can be one or more memories. The one or more memories can be configured to store the captured values and the additional values, for later export or display. Both sets of values can be used to contribute to a single output image. In embodiments, therefore, a sum of the number of the captured values plus the number of the additional values is larger than the number of the pixels in the array. That is because the number of the captured values generally may equal the number of the pixels, but the additional values simply provide more data.

In some embodiments, the additional values are further merged with the captured values when stored. For purposes of this document, this merging means that the additional values have been intermingled with the captured values for uniformly executed export or display according to their location for the output image; and that they are not stored in separate memories or in separate memory sections.

Additionally, if display 180 is provided, it can be configured to display an output image, from the input image. The output image can be constructed from the values captured by the pixels, and from the additional computed values.

The devices and/or systems described in this document perform functions, processes and/or methods, as described in this document. Moreover, methods and algorithms are described below. These methods and algorithms are not necessarily inherently associated with any particular logic device or other apparatus. Rather, they are advantageously implemented by programs for use by a computing machine, such as a general-purpose computer, a special purpose computer, a microprocessor, etc.

Often, for the sake of convenience only, it is preferred to implement and describe a program as various interconnected distinct software modules or features, individually and collectively also known as software. This is not necessary, however, and there may be cases where modules are equivalently aggregated into a single program, even with unclear boundaries. In some instances, software is combined with hardware, in a mix called firmware.

This detailed description includes flowcharts, display images, algorithms, and symbolic representations of program operations within at least one computer readable medium. An economy is achieved in that a single set of flowcharts is used to describe both programs, and also methods. So, while flowcharts described methods in terms of boxes, they also concurrently describe programs.

Methods are now described.

FIG. 4 shows a flowchart 400 for describing methods according to embodiments. The methods of flowchart 400 may also be practiced by embodiments described in this document.

According to an operation 410, captured values may be received. The captured values can be values of respective elements of an input image, and may have been captured by pixels. The captured values may correspond to pixel center points of respective ones of the pixels that captured the values.

According to another operation 430, additional values are computed from the captured values. The additional values may correspond to additional center points. At least some of the additional elements might be different from the pixel center points, in other words, not coincide with them.

An output image can thus be formed, from the captured values and the computed values. In the output image, the captured values may correspond to the pixel center points, and the additional values may correspond to the additional center points.

According to another, optional operation 440, the captured values and the additional values are caused to be stored. Storing can be in one or more memories.

According to another, optional operation 450, an output image is displayed, or caused to be displayed. The output image may have been constructed from the captured values and from the additional values.

Returning to FIG. 2, pixels 232 can be black and white, or color. If they are black and white, then each pixel could be similar to the others. If pixels 232 are color, they could be, for example Red Green Blue, or other combination of color pixels. When operating in such a combination, a pixel may be different from its neighbor. The minimum group of pixels that can operate in such a combination can be called a tile. A pixel array can be considered to be made of substantially similar, or substantially identical tiles.

Examples will now be described of pixel arrays that can capture values, and for which additional values can be computed according to embodiments. In these, examples of tiles will also be shown.

FIG. 5 is a diagram of a tile 511. Tile 511 is a tile of a possible single-layer sensor embodiment of the pixel array of FIG. 2. Tile 511 includes two G pixels, one B pixel and one R pixel, all arranged in a Bayer pattern. The pixels have pixel center points 536, shown as dots. The pixels of tile 511 correspond to pixel center points 536, for the mathematical purposes of constructing the output image.

The pixels of tile 511 capture values for the input image. Plus, in embodiments, additional values can be computed about the input image. These additional values could correspond to additional center points 539, for the mathematical purposes of constructing the output image. As will be seen, such additional center points could be defined also elsewhere with respect to tile 511.

FIG. 6 is a diagram of a tile pair 611 of pixels, which are also known as sensors. Tile pair 611 is a pair of tiles of a possible two-layer pixel embodiment. The upper layer has green pixels 645. The lower layer has blue pixels 644 alternating with red pixels 647, thus effectively creating a Bayer pattern. A tile in pair 611 is made from a combination of any two green pixels 645 that have beneath them a blue pixel 644 and a red pixel 647. So, a single tile can be horizontally the top two pixels, the two pixels on the left, and so on.

In FIG. 6, pixel center points 636 are shown. A pixel center point 636 is the same for one of the green pixels 645 and the one underneath it, because in this embodiment the layers are stacked without an offset. In other words, center points of the photoreceptive area of pixels in the upper layer are vertically aligned with center points of the photoreceptive area of pixels in the lower layer.

The pixels of tile pair 611 capture values for the input image. Plus, in embodiments, additional values can be computed about the input image. These additional values could correspond to additional center points 639, for the mathematical purposes of constructing the output image. For any one of the shown additional center points 639, additional values can be computed for the same location with reference to more tiles in the array, even substantially all of the tiles.

Figure 7:
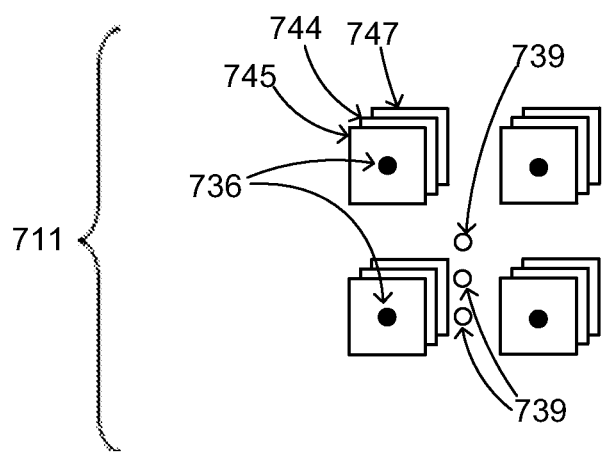
FIG. 7 is a diagram of four tiles of a possible three-layer stacked sensor array made according to embodiments.

FIG. 7 is a diagram of four tiles 711 of pixels. Tiles 711 are from a possible three-layer pixel embodiment. The upper layer has green pixels 745, the middle layer has blue pixels 744, and the lower layer has red pixels 747. These sensors do not form a Bayer pattern. A tile in FIG. 7 is made from any green pixel 745, and those pixels underneath it.

In FIG. 7, pixel center points 736 are shown. A pixel center point 736 is the same for one of the green pixels 745 and the ones underneath it, because in this embodiment the layers are again stacked without an offset.

The pixels of tiles 711 capture values for the input image. Plus, in embodiments, additional values can be computed about the input image. The additional values could correspond to additional center points 739, for the mathematical purposes of constructing the output image. For any one of the shown additional center points 739, additional values can be computed for the same location with reference to more tiles in the array, even substantially all of the tiles.

The previous two examples used stacked layers, but the pixels had no offset. Embodiments can also have stacked pixels whose photoreceptor areas are offset from each other. In such cases, the pixel center points can be defined by vertically merging the planes of the two layers. More analytically, the pixel center points can be defined as those for the pixels in the upper layer, plus those for projections of the pixels in the lower layer onto a plane of the upper layer. Of course, such projections are intended to be vertically in the geometric sense. An example is now described.

Figure 8:
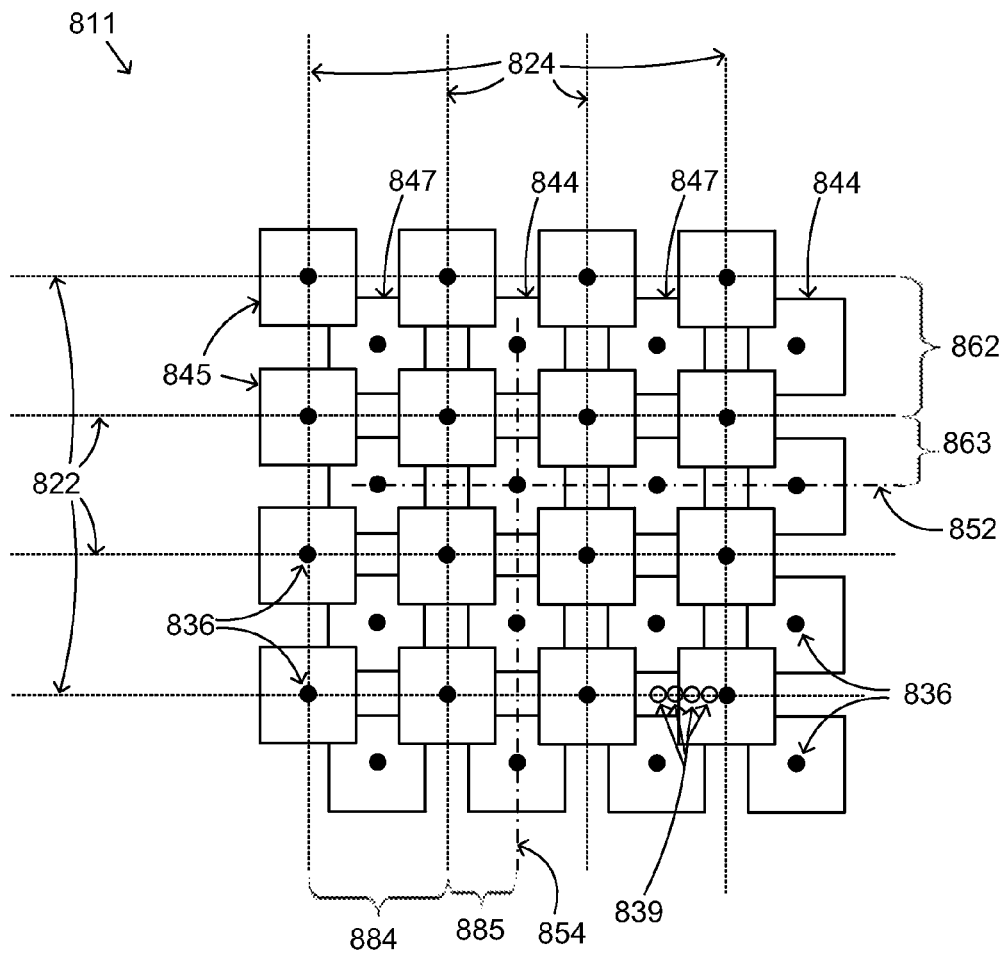
FIG. 8 is a diagram of a two-layer offset stacked sensor array portion made according to embodiments.

FIG. 8 is a diagram of a two-layer offset stacked sensor array portion 811. Array portion 811 includes an upper layer of green pixels 845, and a lower layer of red pixels 847 alternating with blue pixels 844. The pixels of array portion 811 have pixel center points 836, indicated as full dots. Pixel center points 836 may correspond to locations of captured values. It will be appreciated that, since the plane of the diagram collapses the plane of the lower layer and the upper layer, pixel center points 836 are in the same plane regardless of whether they were contributed by pixels of the upper layer or of the lower layer.

The center points of pixels 845 in the upper layer are disposed along rows 822 and columns 824. Rows 822 have a distance 862 between them, which is called the vertical pixel pitch. Columns 824 have a distance 884 between them, which is called the horizontal pixel pitch. In this embodiment, the vertical pitch equals the horizontal pitch, although that is not necessary.

The center points of pixels 847 and 844 in the lower layer are disposed along rows, such as row 852, and columns, such as column 854. In many embodiments, the rows in the lower layer have a distance between them similar to the vertical pixel pitch, and the columns in the lower layer have a distance between them similar to the horizontal pixel pitch.

In the particular example of FIG. 8 the horizontal pixel pitch and the vertical pixel pitch are the same, PTC. The dimension PTC is also called the pixel pitch. The lower layer is offset from the upper layer, vertically by a distance 863 equaling PTC/2, and horizontally by a distance 885 equaling PTC/2.

The pixels of array portion 811 capture values for the input image. Plus, in embodiments, additional values can be computed about the input image. The additional values could correspond to additional center points 839, for the mathematical purposes of constructing the output image. For any one of the shown additional center points 839, additional values can be computed for the same location with reference to more tiles in the array, even substantially all of the tiles.

Figure 9:
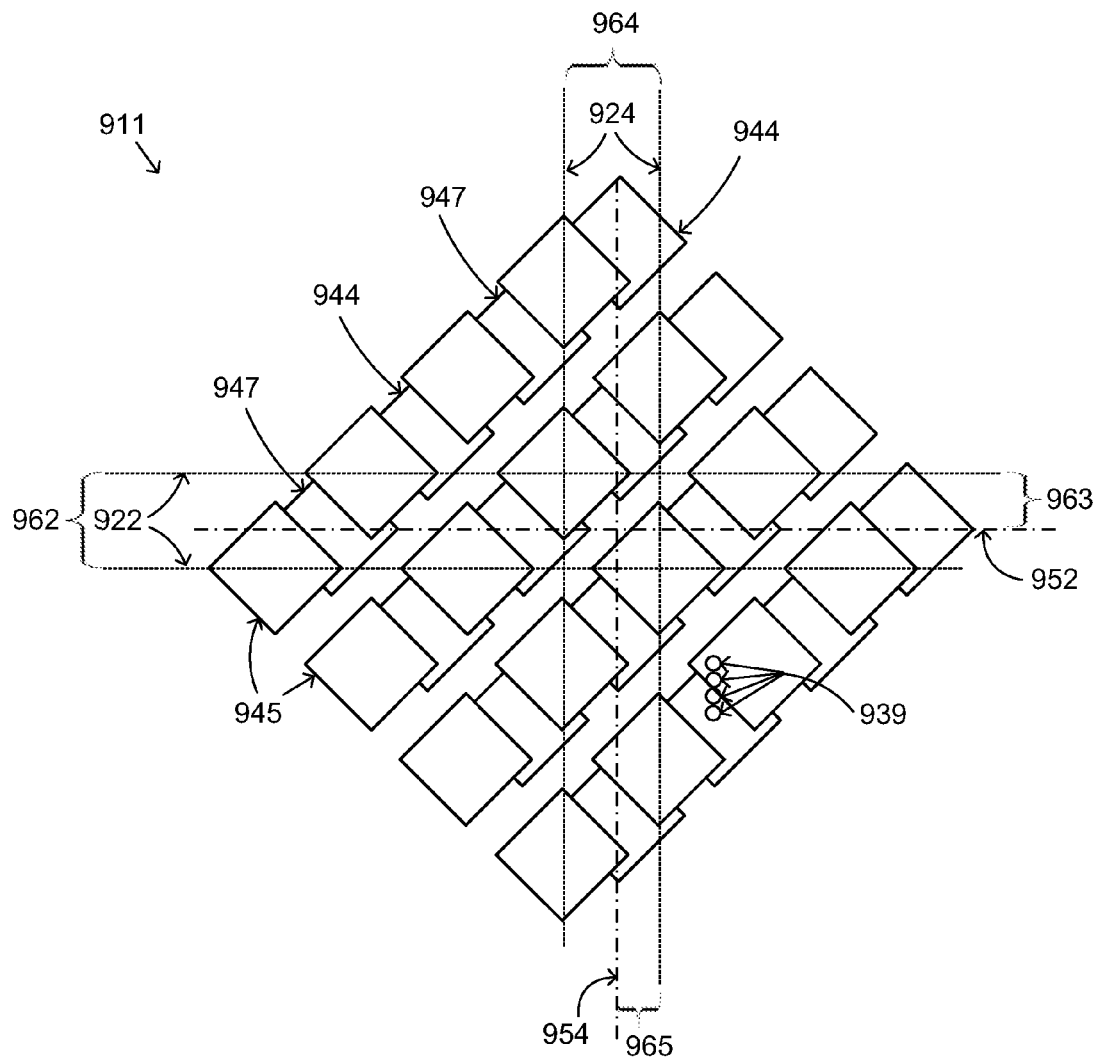
FIG. 9 is a diagram of a two-layer offset stacked sensor array portion made according to a rotated embodiment.

FIG. 9 is a diagram of a two-layer offset stacked sensor array portion 911. Array portion 911 includes an upper layer of green pixels 945, and a lower layer of red pixels 947 alternating with blue pixels 944.

In FIG. 9, pixel center points are not indicated separately, so as to not clutter the drawing. If shown, these center points would be arranged along rows, such as rows 922, and along columns such as columns 924. Further, additional center points can be defined at the center points of the pixels of the lower layer, but are not shown separately. These center points are arranged along rows such as row 952, and along columns such as column 954.

In FIG. 9, the rectangular boundaries of the pixels define lines rotated by 45° from the horizontal and the vertical. If one were to measure pixel pitch PTC along those rotated lines, then the effective pixel pitch measured along rows 922, 952 and columns 924, 954 would be different. Pitch 962 between rows 922, and pitch 964 between columns 924 would equal PTC*SQRT(2). And offsets 963, 965 would equal PTC/SQRT(2).

The pixels of array portion 911 capture values for the input image. Plus, in embodiments, additional values can be computed about the input image. The additional values could correspond to additional center points 939, as above, for one or more tiles.

Figure 10:
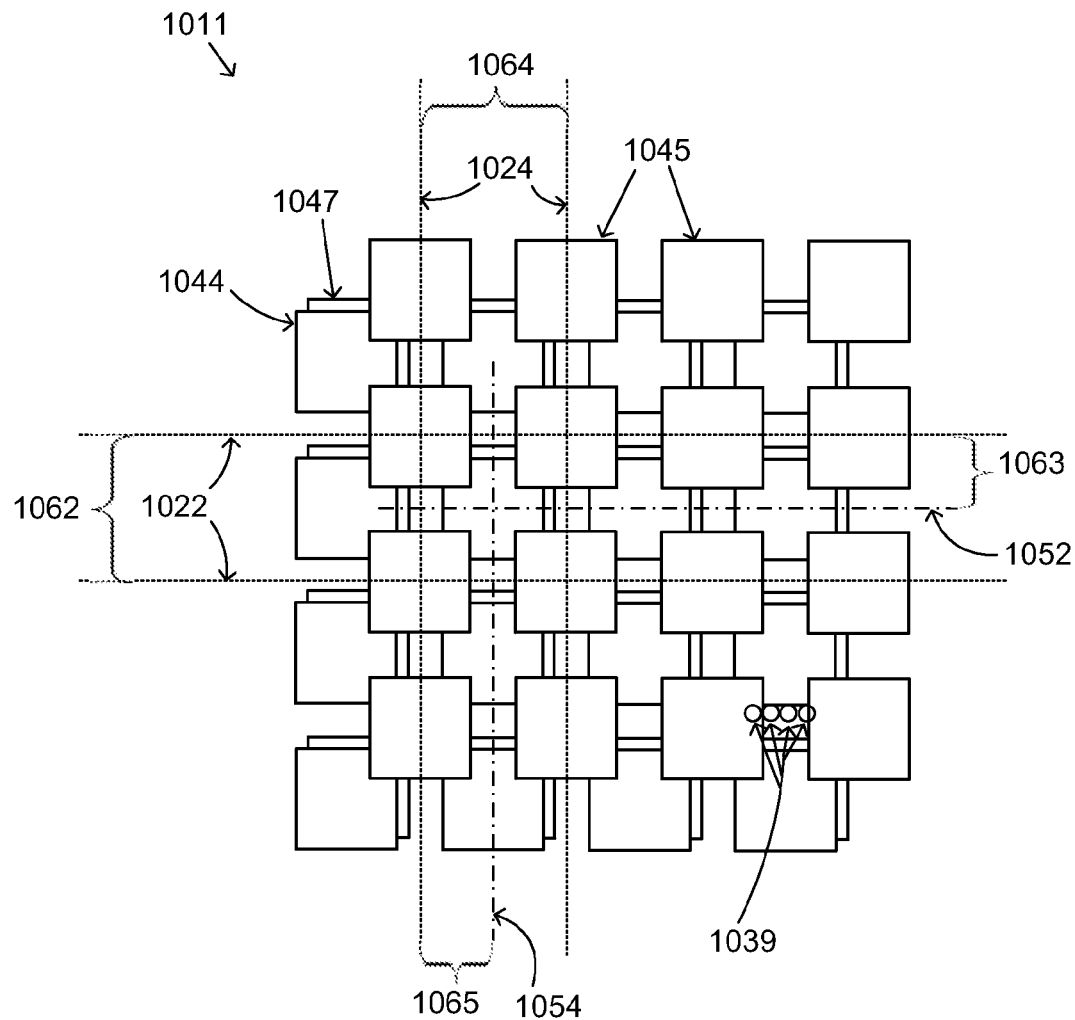
FIG. 10 is a diagram of a three-layer offset stacked sensor array portion made according to embodiments.

FIG. 10 is a diagram of a three-layer offset stacked sensor array portion 1011. Array portion 1011 includes an upper layer of green pixels 1045, a middle layer of blue pixels 1044 and a lower layer of red pixels 1047.

In FIG. 10, the center points of green pixels 1045 are arranged along rows, such as rows 1022, and along columns, such as columns 1024. Distance 1062 equals distance 1064 equals pitch PTC. Blue pixels 1044 are stacked over red pixels 1047 with no offset. However, blue pixels 1044 are arranged along rows, such as row 1052, and along columns, such as column 1054. The rows and columns of blue pixels 1044 have vertical and horizontal offsets of PTC/2 from rows 1022 and columns 1024.

The pixels of array portion 1011 capture values for the input image. Plus, in embodiments, additional values can be computed about the input image. The additional values could correspond to additional center points 1039, as above, for one or more tiles.

Figure 11:
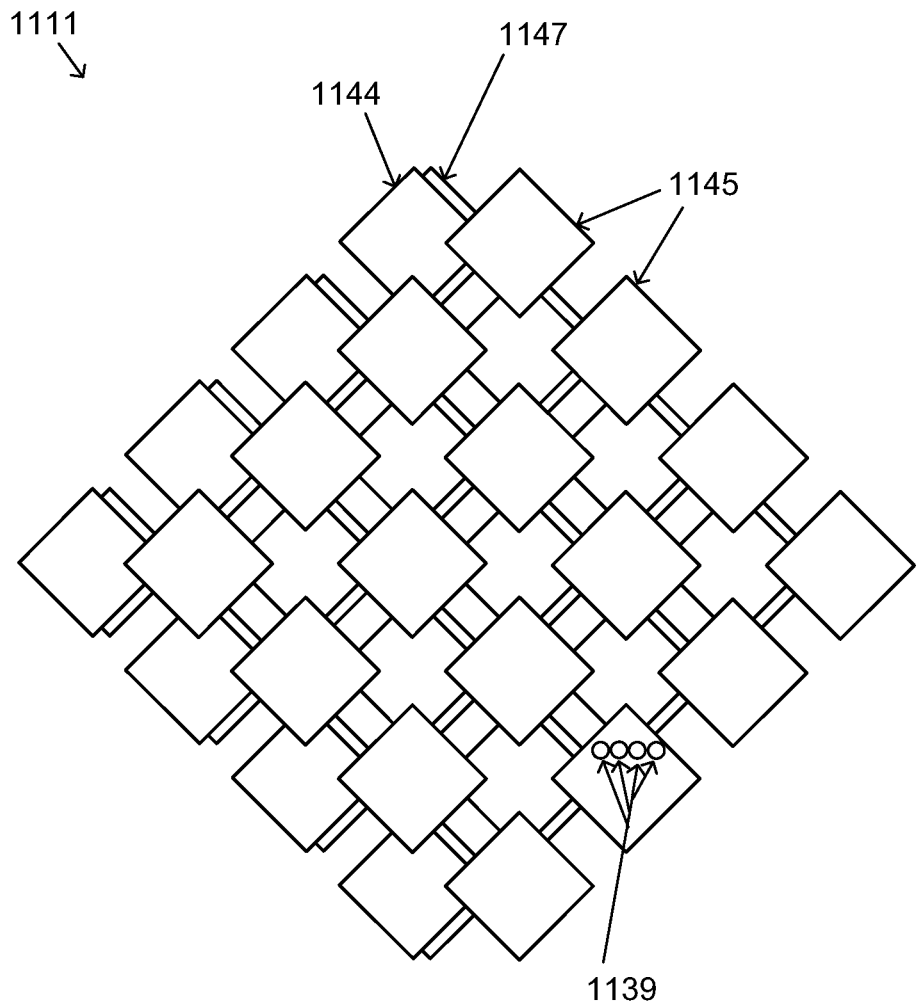
FIG. 11 is a diagram of a three-layer offset stacked sensor array portion made according to a rotated embodiment.

FIG. 11 is a diagram of a three-layer offset stacked sensor array portion 1111. Array portion 1111 includes an upper layer of green pixels 1145, a middle layer of blue pixels 1144 and a lower layer of red pixels 1147. It will be recognized that array portion 1111 has a design similar to that of array portion 1011, except that it is rotated by 45°.

The pixels of array portion 1111 capture values for the input image. Plus, in embodiments, additional values can be computed about the input image. The additional values could correspond to additional center points 1139, as above, for one or more tiles.

Figure 12:
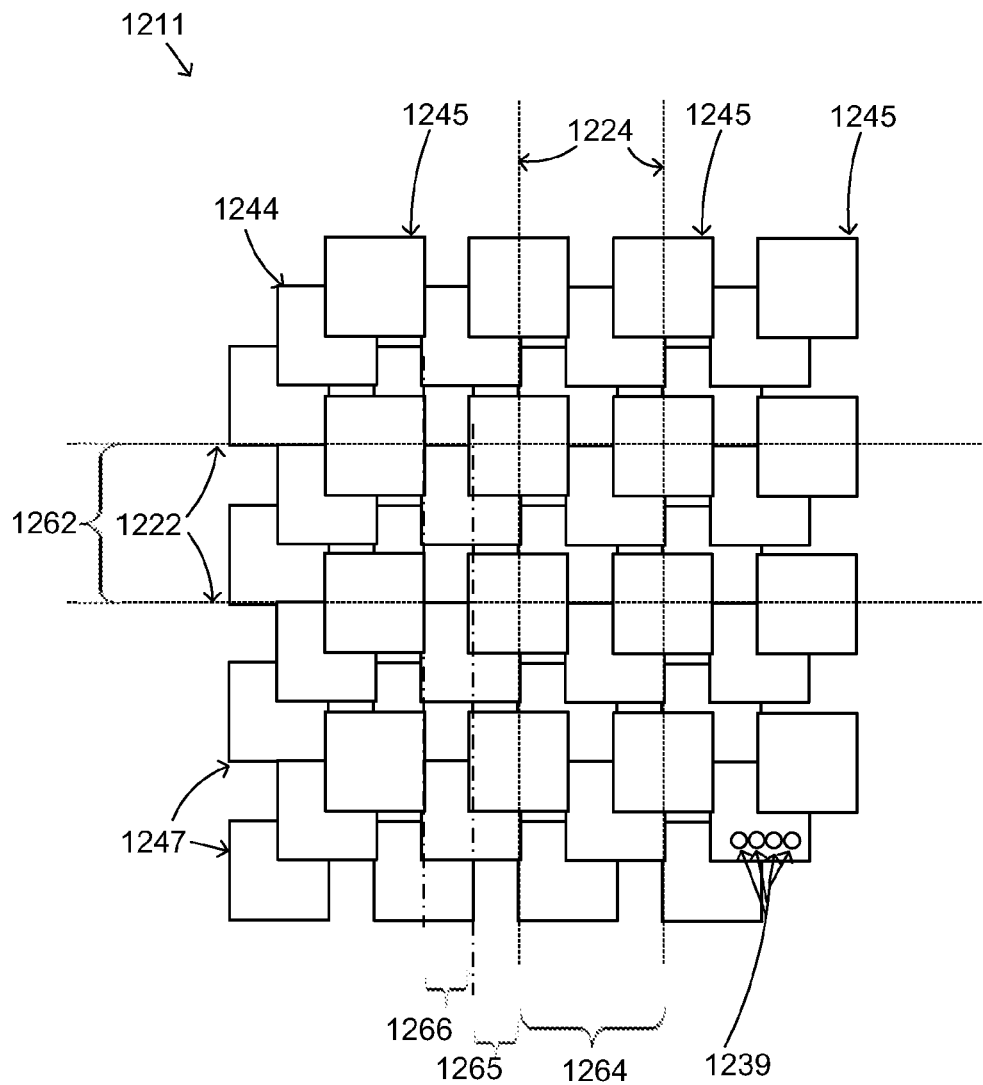
FIG. 12 is a diagram of a three-layer offset stacked sensor array portion made according to embodiments.

FIG. 12 is a diagram of a three-layer offset stacked sensor array portion 1211. Array portion 1211 includes an upper layer of green pixels 1245, a middle layer of blue pixels 1244 and a lower layer of red pixels 1247.

In FIG. 12, the center points of green pixels 1245 are arranged along rows, such as rows 1222, and along columns, such as columns 1224. Distance 1262 equals distance 1264 equals pitch PTC. The middle layer is offset from the upper layer vertically and horizontally by equal distances of PTC/3, which is distance 1265. The lower layer is offset from the middle layer vertically and horizontally by equal distances of PTC/3, which is distance 1266.

The pixels of array portion 1211 capture values for the input image. Plus, in embodiments, additional values can be computed about the input image. The additional values could correspond to additional center points 1239, as above, for one or more tiles.

The above description showed a variety of possible embodiments. Before proceeding with details of computing the additional values, an overall imaging system is now described.

Figure 13:
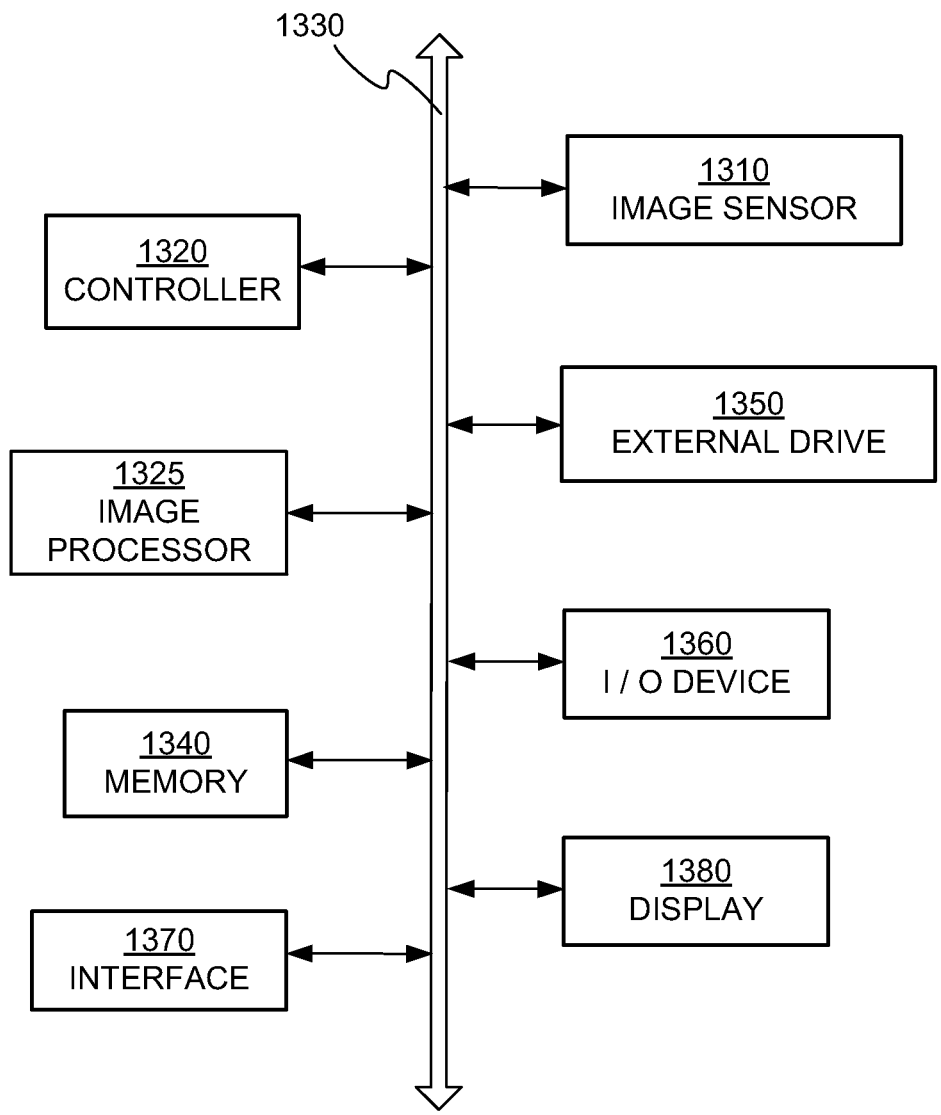
FIG. 13 depicts a controller-based system for an imaging device, which uses an imaging array made according to embodiments.

FIG. 13 depicts a controller-based system 1300 for an imaging device made according to embodiments. System 1300 could be for the device of FIG. 1.

System 1300 includes an image sensor 1310, which is made according to embodiments, such as by a pixel array. Examples of pixels arrays were seen above. As such, system 1300 could be, without limitation, a computer system, an imaging device, a camera system, a scanner, a machine vision system, a vehicle navigation system, a smart telephone, a video telephone, a personal digital assistant (PDA), a mobile computer, a surveillance system, an auto focus system, a star tracker system, a motion detection system, an image stabilization system, a data compression system for high-definition television, and so on.

System 1300 further includes a controller 1320, which is made according to embodiments. Controller 1320 could be the controller 120 of FIG. 1. Controller 1320 could be a Central Processing Unit (CPU), a digital signal processor, a microprocessor, a microcontroller, an application-specific integrated circuit (ASIC), a programmable logic device (PLD), and so on. In some embodiments, controller 1320 communicates, over bus 1330, with image sensor 1310. In some embodiments, controller 1320 may be combined with image sensor 1310 in a single integrated circuit. Controller 1320 controls and operates image sensor 1310, by transmitting control signals from output ports, and so on, as will be understood by those skilled in the art.

Controller 1320 may further communicate with other devices in system 1300. One such other device could be a memory 1340, which could be a Random Access Memory (RAM) or a Read Only Memory (ROM), or a combination. Memory 1340 may be configured to store instructions to be read and executed by controller 1320. Memory 1340 may be configured to store images captured by image sensor 1310, both for short term and long term.

System 1300 could further include an image processor 1325, for processing the input image according to embodiments. Image processor 1325 could be image processor 125 of FIG. 1. In some embodiments, image processor 1325 communicates, over bus 1330, with image sensor 1310.

Another such device could be an external drive 1350, which can be a compact disk (CD) drive, a thumb drive, and so on. One more such device could be an input/output (I/O) device 1360 for a user, such as a keypad, a keyboard, and a display. Memory 1340 may be configured to store user data that is accessible to a user via the I/O device 1360.

An additional such device could be an interface 1370. System 1300 may use interface 1370 to transmit data to or receive data from a communication network. The transmission can be via wires, for example via cables, or USB interface. Alternately, the communication network can be wireless, and interface 1370 can be wireless and include, for example, an antenna, a wireless transceiver and so on. The communication interface protocol can be that of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so on.

One more such device can be a display 1380. Display 1380 could be display 180 of FIG. 1. Display 1380 can show to a user a tentative image that is received by image sensor 1310, so to help them align the device, perhaps adjust imaging parameters, and so on.

Computations according to embodiments are now described in more detail for a sample array. Computations according to embodiments will be similarly possible for different arrays. The following description is in terms of a journey starting from physical considerations, and gradually proceeding to more abstract, mathematical considerations.

Figure 14:
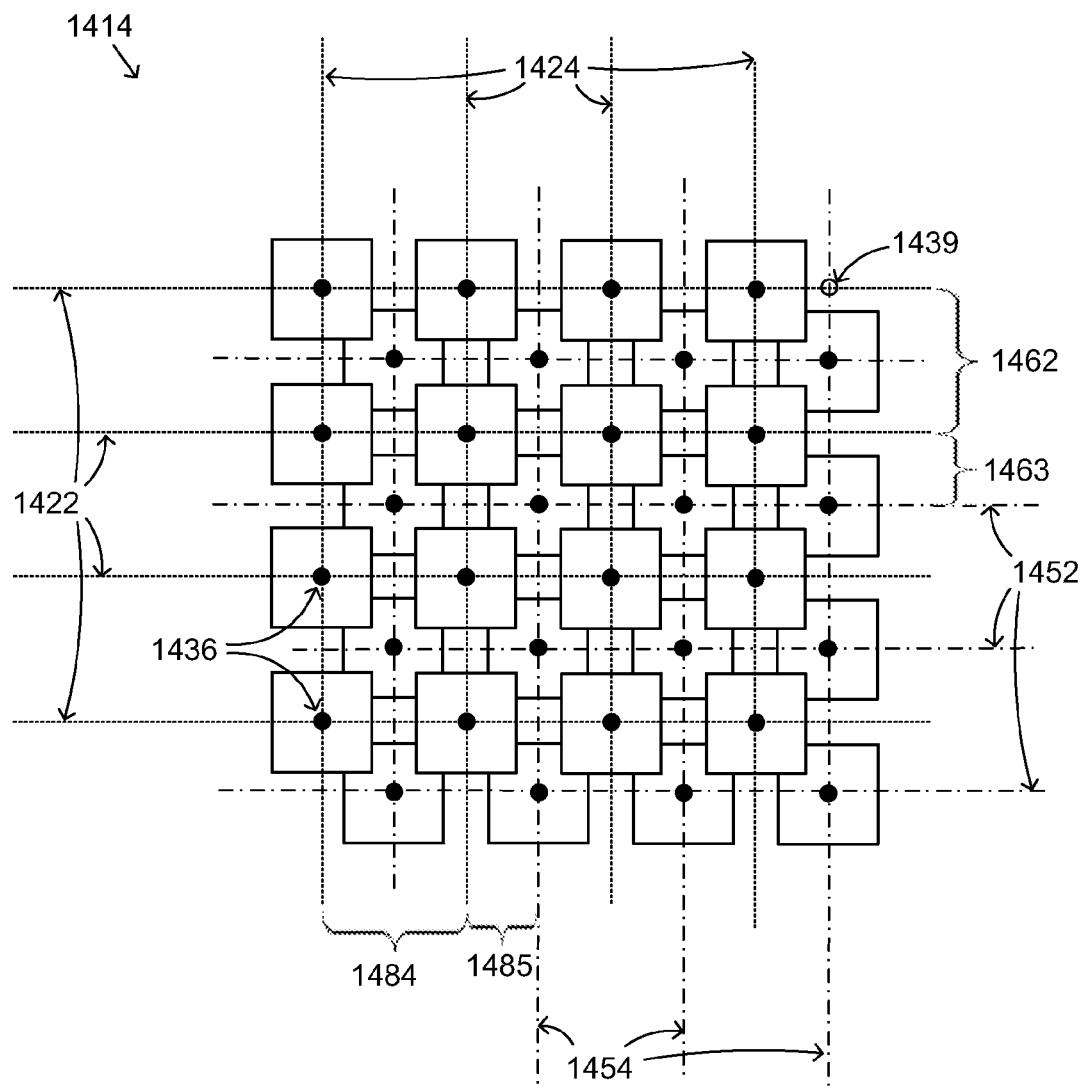
FIG. 14 is a diagram of a physical two-layer offset stacked sensor array portion, according to embodiments.

FIG. 14 is a diagram of a physical two-layer offset stacked sensor array portion 1414. It will be recognized that a special case of array portion 1414 is array portion 811. More particularly, array portion 1414 includes an upper layer of pixels and a lower layer of pixels. The pixels of array portion 1414 have pixel center points 1436, indicated as full dots. Pixel center points 1436 may correspond to locations of captured values. Pixel center points 1436 are in the same plane, which is the plane of the drawing, regardless of whether they were contributed by pixels of the upper layer or of the lower layer.

The pixels of array portion 1414 capture values for the input image. Plus, in embodiments, one or more additional values can be computed about the input image. In FIG. 14, an additional center point 1439 is shown at an advantageously chosen location, namely at the intersection of one of rows 1422 of the top pixel layer, with one of columns 1454 of the bottom pixel layer. While only one additional center point 1439 is shown, more can be chosen, as per the above. The additional values could correspond to the one or more additional center points 1439, for the mathematical purposes of constructing the output image.

As the starting point of the journey, array portion 1414 is also called a pixel layer location grid, and is made from a top grid and a bottom grid. The center points of the pixels in the upper layer are disposed along rows 1422 and columns 1424, which thus comprise the top grid. Rows 1422 have a vertical pixel pitch given by distance 1462. Columns 1424 have a horizontal pixel pitch given by distance 1484. In this embodiment, the vertical pitch equals the horizontal pitch, equals PTC.

The center points of the pixels in the lower layer are disposed along rows, such as rows 1452, and columns, such as columns 1454. These rows and these columns thus comprise the bottom grid. In embodiments of FIG. 8, the rows and the columns in the lower layer have the same pitch PTC as those in the upper layer. The lower layer is offset from the upper layer, vertically by a distance 1463 equaling PTC/2, and horizontally by a distance 1485 equaling again PTC/2.

Figure 15:
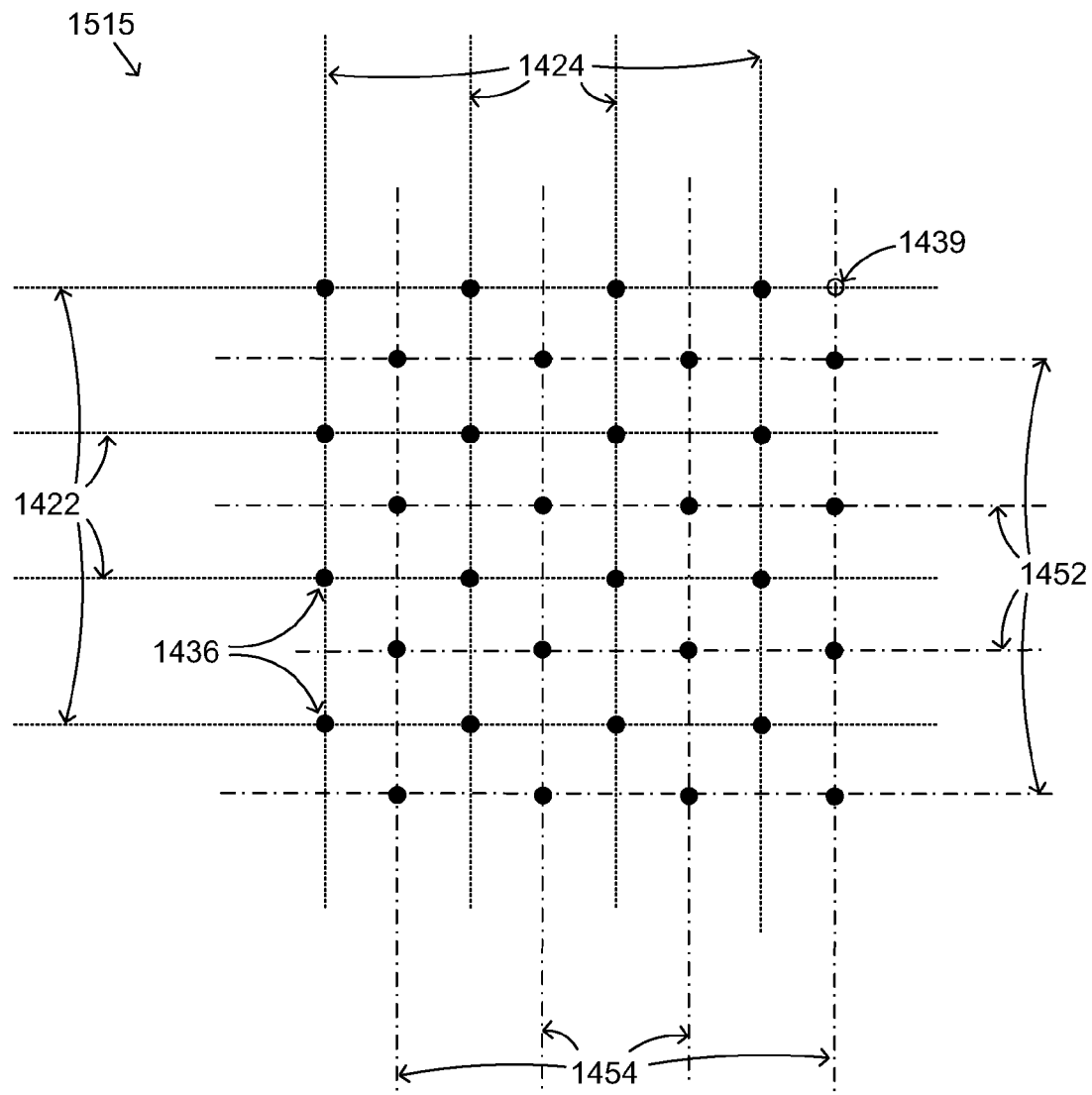
FIG. 15 is a diagram of a portion of a physical sample image construction grid according to embodiments.

FIG. 15 is a diagram of a portion 1515 of a physical sampling grid. Portion 1515 is made only from the rows and the columns of the pixel layer location grid of FIG. 14, plus pixel center points 1436. It will be appreciated that the top grid of FIG. 14 is superimposed on the bottom grid of FIG. 14, and the top grid and the bottom grid have been collapsed and merged into a single plane in FIG. 15. Portion 1515 thus represents the locations of all the physical sampling photosites in the array, which will provide the captured values.

In FIG. 15, an additional value can be computed about the input image, which would correspond to an additional center point 1439. The selection of the array of FIG. 14 permits more such points, as is now described.

Figure 16:
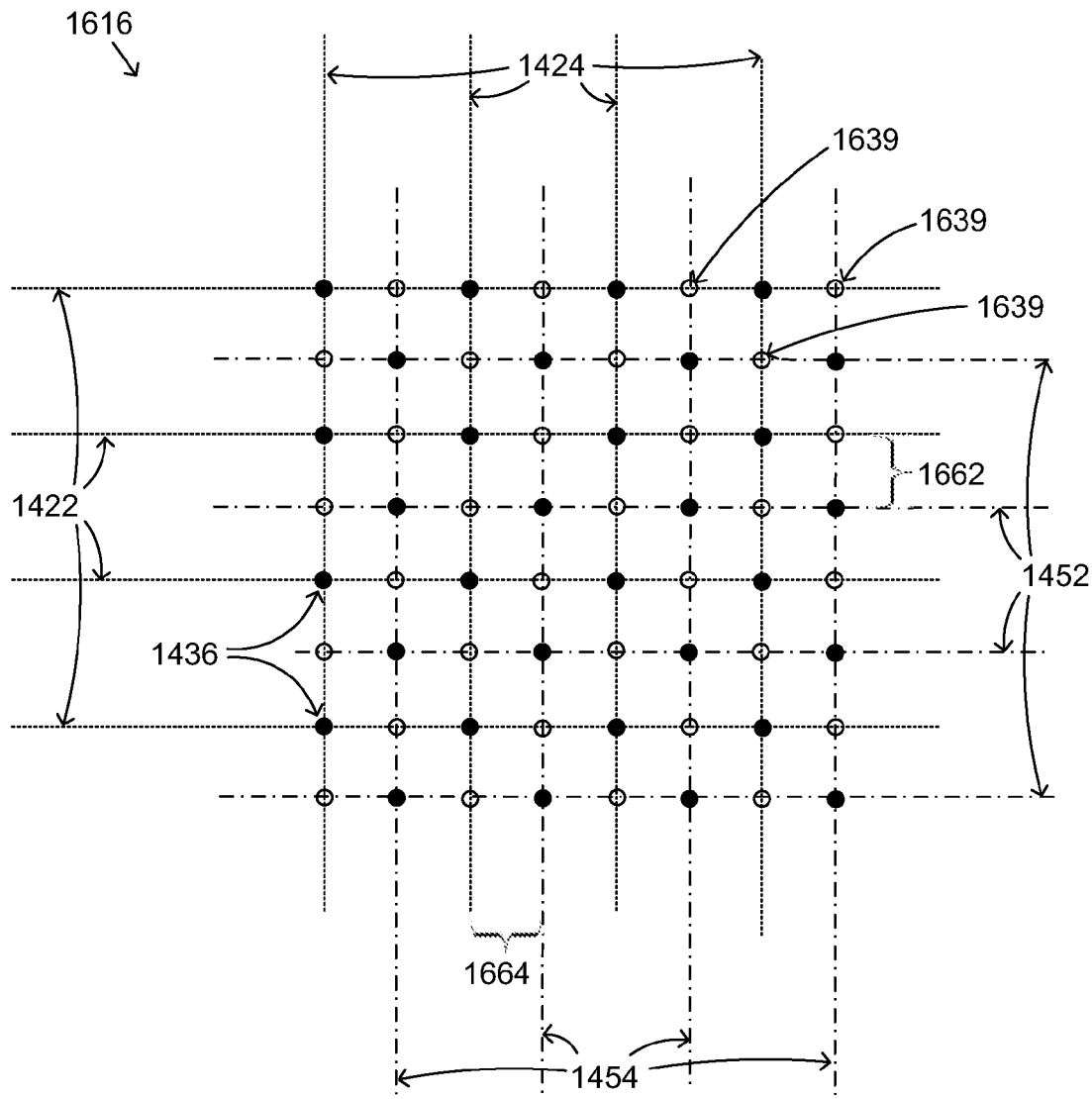
FIG. 16 is a diagram of a portion of a sample image construction grid according to embodiments.

FIG. 16 is a diagram of a portion 1616 of a sample image construction grid according to embodiments. Portion 1616 is made from a physical sample image construction grid, such as that of FIG. 15, together with additional center points 1639 that will be used. It will be recognized that additional center points 1639 are created by replicating additional center points 1439 of FIG. 14 in advantageous spaces of the physical sample image construction grid portion lower layer of FIG. 15.

As such, in sample image construction grid portion 1616 every intersection of a row and a column will contribute a value for the final image. Values corresponding to pixel center points 1436 will have been the captured values for the input image, and values corresponding to additional center points 1639 will have been the additional computed values about the input image.

It will be further appreciated that, since every intersection in FIG. 16 will contribute a value for the final image, the effective pitch will become less. To better appreciate this, however, a more detailed description is now presented as to how a tile is defined.

A tile is a group of pixels that may be adjacent to each other in a vertical dimension, and/or a horizontal dimension and/or a depth dimension. Plus, the pixels of a tile are a minimum in number. Moreover, taken as a group, the pixels of a tile have substantially identical properties, regardless of their location within the array. The definition of a tile is used when there are pixels of different colors, which are expected to work in combination. Sometimes a process is applied for this combination, called demosaicking, as it treats the pixels of a tile as a mosaic. As will be appreciated in considering these concepts, tiles can also be defined from the pixel center points.

In some embodiments, for each tile, an additional center point may be replicated along with a tile. While in the examples below an additional center point is shown within a tile, such is not necessary.

In some embodiments, the additional values that correspond to additional center points are demosaicked jointly with the captured values. The output image can then be constructed from the joint demosaicking.

Examples of such tiles are now described. Through these examples, it should be kept in mind that, in other embodiments, two or more additional center points can be defined for each tile.

Figure 17:
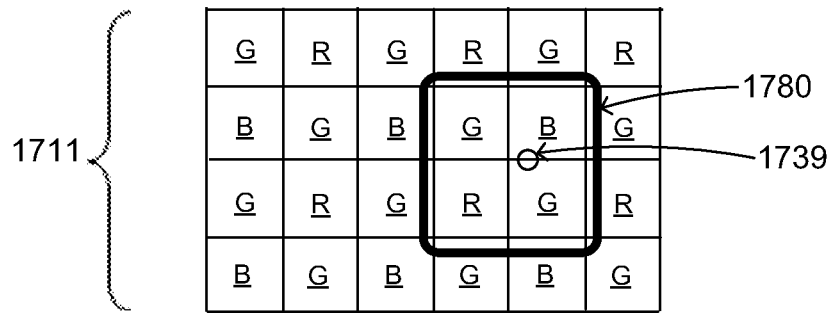
FIG. 17 is a diagram showing a single-layer sensor array portion, and further identifying a sample tile for locating additional center points for additional values according to embodiments.

FIG. 17 is a diagram showing a single-layer sensor array portion 1711. Portion 1711 is of the same Bayer pattern as in FIG. 5. A sample tile is 1780. A sample additional center point 1739 is shown within tile 1780.

Figure 18:
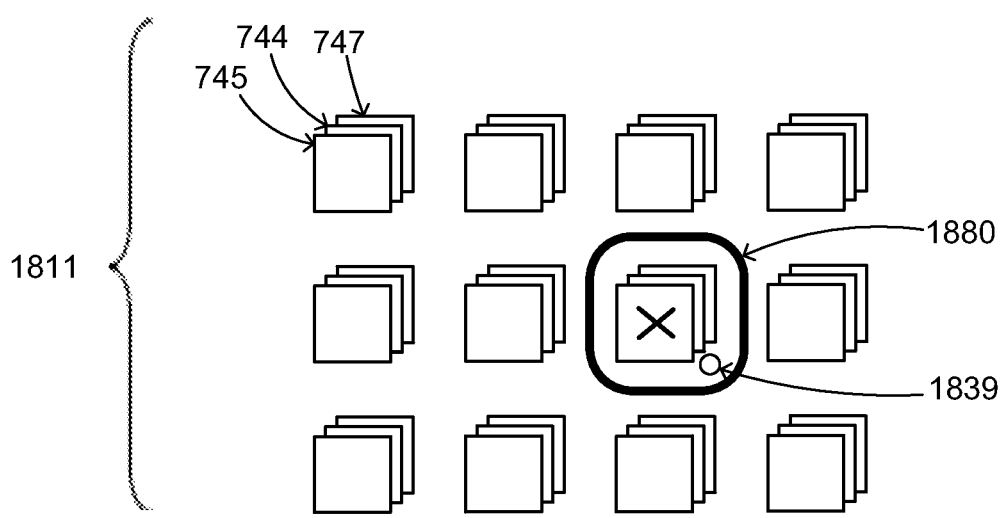
FIG. 18 is a diagram showing a three-layer stacked sensor array portion, and further identifying a sample tile for locating additional center points for additional values according to embodiments.

FIG. 18 is a diagram showing a three-layer stacked sensor array portion 1811. Portion 1811 is of the same pattern as in FIG. 7, with the same types of pixels. A sample tile is 1880, of three pixels adjacent only in the depth dimension. A sample additional center point 1839 is shown within tile 1880.

FIG. 19 is a diagram showing a two-layer stacked sensor array portion 1911. Portion 1911 is of the same pattern as in FIG. 6, with the same types of pixels. A sample tile is 1980, of four pixels adjacent in the width and in the depth dimension. Two sample additional center points 1939 are shown within tile 1980.

FIG. 20 is a diagram showing a two-layer stacked offset sensor array portion 2011. Portion 2011 is of the same pattern as in FIG. 8, with the same types of pixels. A sample tile is 2080, of four pixels adjacent in the width and in the depth dimension with offset. A sample additional center point 2039 is shown within tile 2080. More such additional center points are possible. An example is now described.

Figure 21:
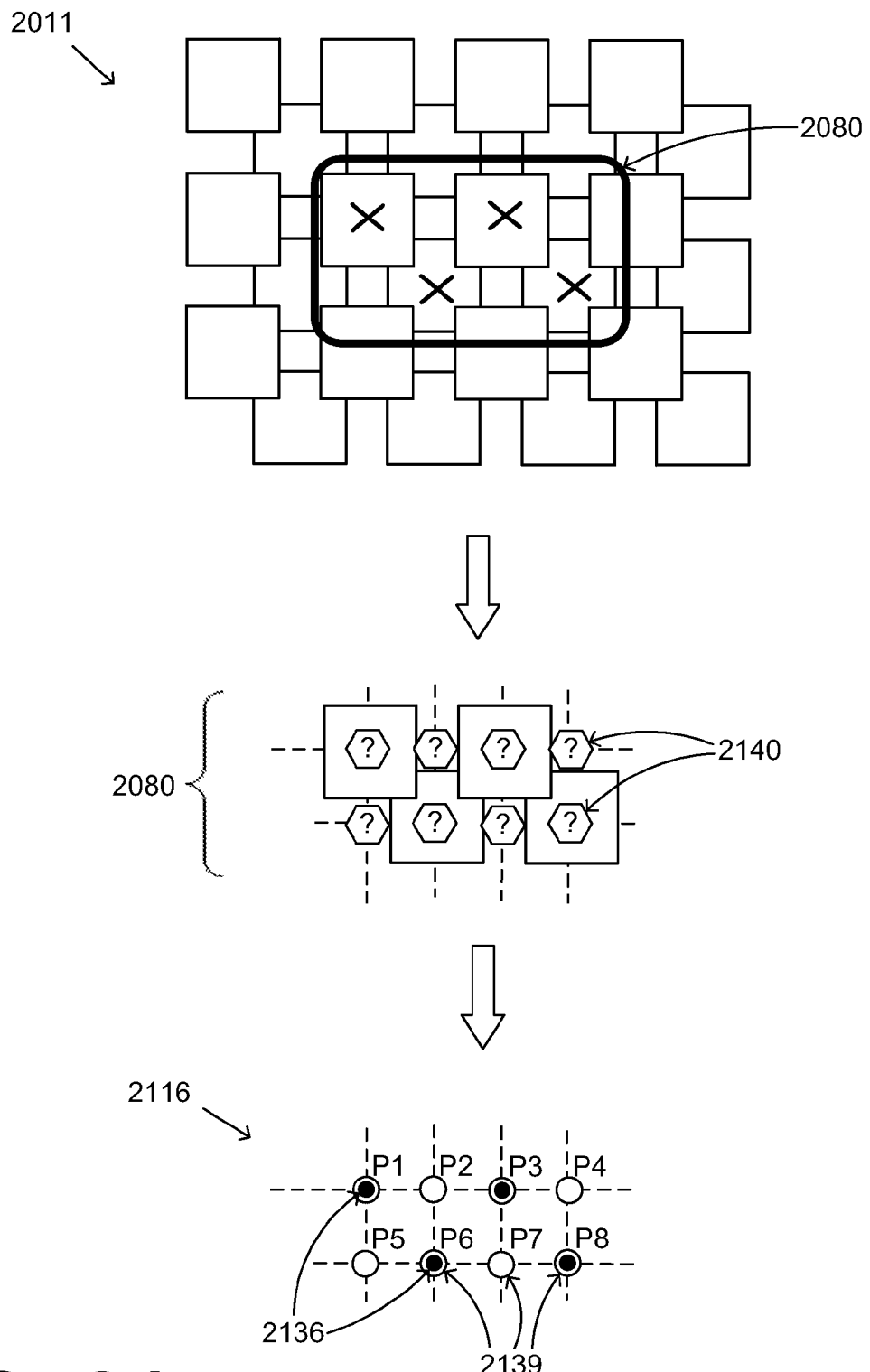
FIG. 21 shows sequential diagrams depicting another journey from the array portion of FIG. 20 to an image construction grid according to embodiments.

FIG. 21 shows sequential diagrams depicting another journey. Array portion 2011 is repeated from FIG. 20, with tile 2080 designated.

Moving downward from array portion 2011, the pixels of tile 2080 alone are then considered isolated. In addition, locations 2140 are shown, where additional values will be computed. It should be noted that, for some of these locations 2140, there is already a captured value of one color from the underlying color pixel. The hexagons with embedded question marks for locations 2140 are a vehicle for showing where additional values could be computed.

Moving further downward from tile 2080, an image construction grid 2116 is shown. Points P1, P2, . . . , P8 are shown at the intersections of grid 2116. All these points P1, P2, . . . , P8 are additional center points 2139, and therefore are shown as including a circle 2139. Additional values will be computed that correspond to them. Plus, points P1, P3, P6, P8 are also pixel center points, and therefore are shown as including a dot 2136. A captured value corresponds to each of them, from the underlying pixel. It will be observed that points P1, P3, P6, P8 include both a dot 2136 and a circle 2139. Notwithstanding the captured value, an additional value maybe calculated for these points, such as for a different color.

For the computation of the additional values, according to embodiments, one or more filter functions can be used. Examples are now described. As the description proceeds, it will be seen that a filter function can have filter parameters, and different values for the filter parameters may be used.

Figure 22:
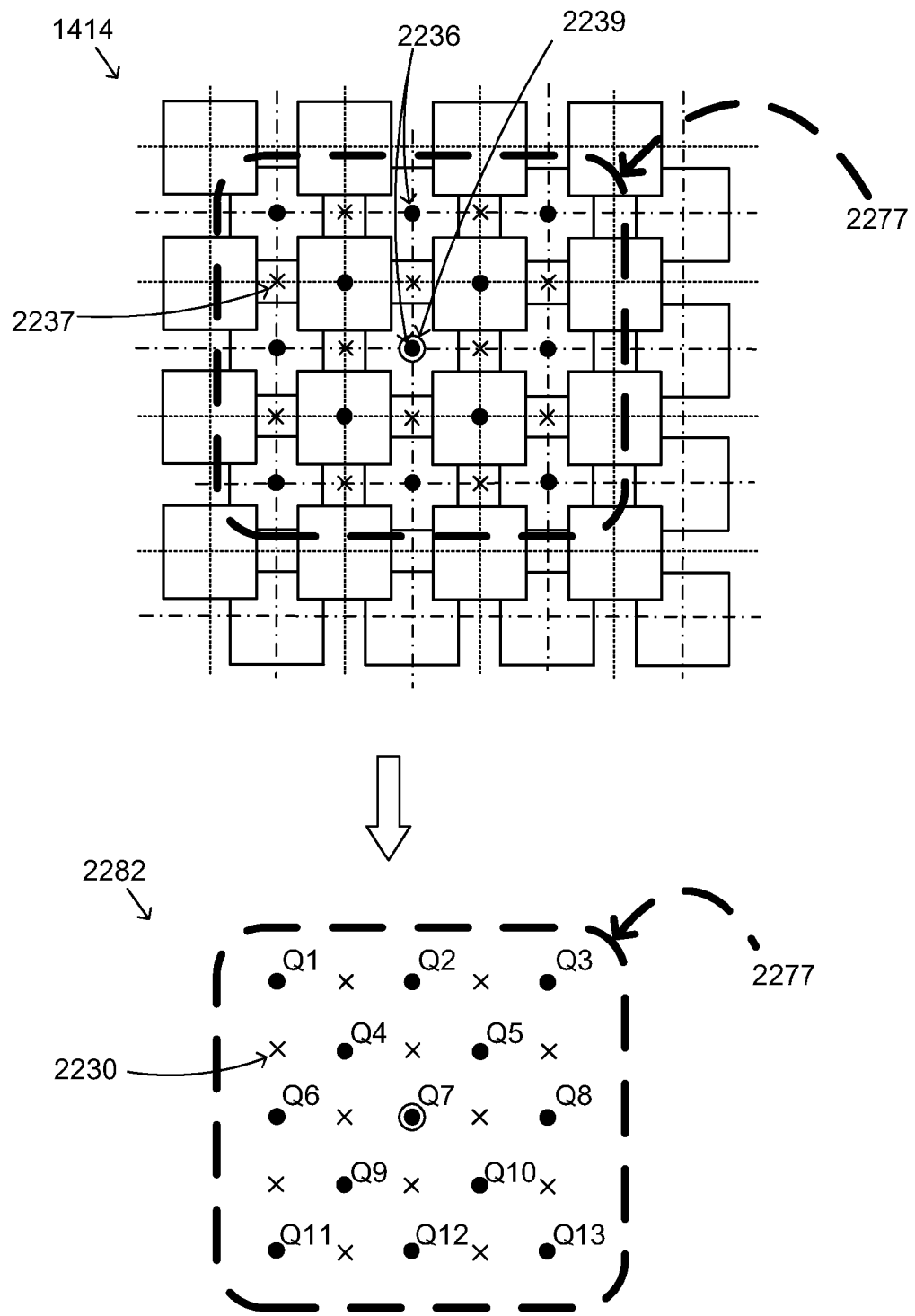
FIG. 22 shows sequential diagrams depicting gathering captured values for computing an additional value for an additional center point in the array portion of FIG. 14, according to embodiments.

FIG. 22 shows sequential diagrams. Array portion 1414 is repeated from FIG. 14. Within array portion 1414, a pixel center point 2236 is designated. Moreover, an additional value will be computed for pixel center point 2236. As such, pixel center point 2236 is also designated as an additional center point 2239.

According to embodiments, the additional value may be computed from a kernel of the captured values that surround additional center point 2239. Accordingly, a kernel 2277 can be defined around additional center point 2239, which encircles the captured values that will be used for the computation of the additional value. It will be observed that kernel 2277 also encircles points like point 2237, which have no captured value.

Moving downward from array portion 1414, a location set 2282 is shown for kernel 2277. Location set 2282 includes the captured values for pixel center points Q1, Q2, . . . , Q13. Pixel center points Q1, Q2, . . . , Q13 correspond to enumerated locations. Location set 2282 further includes null values 2230, for points like point 2237, which have no captured value. Those can be ignored or set to zero, when the additional value is computed.

As mentioned above, the process of FIG. 22 is intended for computing the additional value at additional center point 2239. The process may need to be repeated for computing additional values at additional center points of a tile, such as those shown in image construction grid 2116 of FIG. 21 for tile 2080. Location set 2282 can also be thought of as a kernel and/or a vector Hp. In that context, additional center point 2239 is also defined as a unique filter location p, and location set 2282 shows the locations within kernel Hp, centered over a construction location p, within tile (i, j), and layer l. For example, central location Q7 of location set 2282 could be applied for point P6 of image construction grid 2116, and then for point P8. That will also be an instance where the additional value that corresponds to, say, additional center point P6 within tile 2080 is computed from one of the captured values within tile 2080, such as the value at P3, and from one of the captured values outside the certain tile, such as a value one above point P2.

Figure 23:
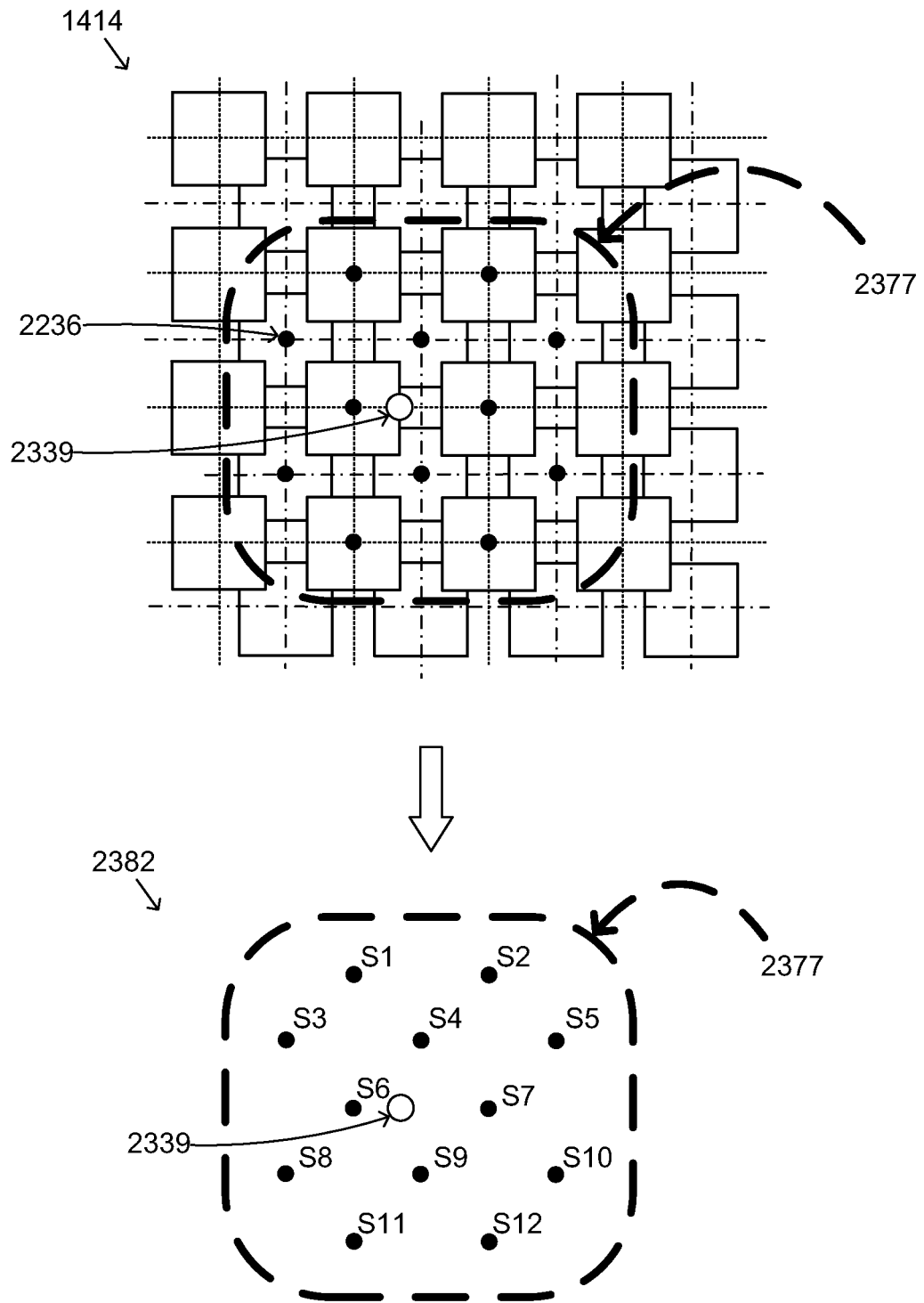
FIG. 23 shows sequential diagrams depicting gathering captured values for computing an additional value for a different additional center point in the array portion of FIG. 14, according to embodiments.

FIG. 23 shows sequential diagrams. Array portion 1414 is repeated from FIG. 14. Within array portion 1414, pixel center points 2336 are designated. Captured values correspond to pixel center points 2336. Moreover, an additional value will be computed that will correspond to additional center point 2339. Differently, additional center point 2339 is not at the intersection of any axes, and does not enjoy the many symmetries of point 2239 in previous diagrams.

According to embodiments, a kernel 2377 can be defined around additional center point 2339, which encircles the captured values that will be used for the computation of the additional value. As also above, kernel 2377 also encircles points that have no captured value, and which are not designated separately in FIG. 23.

Moving downward from array portion 1414, a location set 2382 is shown for kernel 2377. Location set 2382 includes the captured values for pixel center points S1, S2, ..., S12. Pixel center points S1, S2, ..., S12 correspond to enumerated locations. Point 2339 is also shown.

From the above, some filter parameters can be appreciated. First a filter parameter can be the size of kernels 2277, 2377, in other words the size of the filter. Good values seem to be 5×5 to 7×7. Good values for rectangular-shaped kernels further seem to be those using an odd number by the same odd number, so that the filter will be evenly weighed around the additional center point. Of course, a kernel according to embodiments need not be rectangular. Second, a filter parameter can be the weight coefficients that can multiply the different captured values, for example depending on their location within the kernel.

More detailed computation methods according to embodiments are now described, for the additional values. These additional values can be denominated in any suitable color space. Embodiments may include the RGB color space, the red-white-blue color space and the luminance—chrominance color space. More particular examples are now described.

FIG. 24 shows equations that can be used for computing R, G, B values according to embodiments. It will be recognized that these equations represent the process of linear convolution, applied in two dimensions, by summing captured values of pixels that have been specially weighted according to the above mentioned weight coefficients. The convolution is in a neighborhood around the construction location.

In the equations of FIG. 24, subscript l is the number of layers in the pixels sensor array. The convolution is a summation over all layers l.

Each tile T can have identifying subscripts $T(i, j)$, and the convolution may be performed for locations p within each tile $(i,j)$. Vector $X(i,j,p,l)$ stands for the captured values within a kernel at tile $T(i,j)$, intra-tile location p, and layer l.

The weight coefficients, which are also known as weights, can be given by vector filter H. There can be multiple such filters H, one for each combination of layer l, intra-tile construction location p, and color. For the Red, Green, Blue colors, these filters can be $H(p,l)^R$, $H(p,l)^G$ and $H(p,l)^B$. Each such filter can be of a suitable size, such as the previously mentioned 7×7.

The values for R, G, B can therefore be computed from FIG. 24. It will be appreciated that locations within kernel H and corresponding where a physical pixel does not exist can be ignored, because no captured value is provided. Ignoring can be implemented by excluding such from the calculations, setting the appropriate weight coefficient to zero, etc.

Alternative computations may be performed by using the luminance—chrominance color space. If these are used, then they may be further converted to R, G, B, in which case fewer calculations may be needed than the above-described direct R, G, B computations. Particular embodiments are now described.

FIG. 25A shows an equation for estimating luminance $Y(i,j,p)$ for the additional values. A different filter can be used, namely $H(p,l)^Y$, which can be on the larger side, such as 7×7, given the nature of luminance. Again, summation can be over all layers l.

FIG. 25B shows an equation for estimating a color difference $C(i,j,p,l)$. The color difference is between the captured or sensed values, and what is derived by the luminance computation of FIG. 25A.

FIG. 25C shows equations for estimating chrominance values $C(i,j,p)^R$, $C(i,j,p)^G$ and $C(i,j,p)^B$ for the R, G, B colors respectively. The estimating uses the color difference estimated from the equation of FIG. 25B. Different filters can be used, namely $H(p,l)^{CR}$, $H(p,l)^{CG}$ and $H(p,l)^{CB}$, which can be on the smaller side, such as 5×5. Again, summation is over all layers l.

FIG. 25D shows equations for estimating RGB values, such as those of FIG. 24. In FIG. 25D, however, the RGB values are reconstructed from the luminance values of FIG. 25A and the differences in chrominance from FIG. 25C.

Of course, the above described operations assume that the one or more filter functions, or just filters, are known for the computations. According to embodiments, the filters are first trained, to determine good values for their parameters. The trained filters are then used for ready devices. Examples are now described.

FIG. 26 is a diagram 2600 for describing filter training operations according to embodiments. A reference image 2610 can be selected, and is treated as the source. Reference image 2610 can be selected from a collection of typical scenes, both natural and man-made. In preferred embodiments, the frequency of types of scenes in the selected image reflects the frequency of those types of scenes captured by representative users of imaging device 100, such as photographers.

A target image 2612 can be derived from selected reference image 2610 according to an embodiment of one of a number of possible derivation methods. Sample algorithms for such derivation methods are described later in this document. Target image 2612 can also be thought of as a target version of reference image 2610, and also be called target reference image. Target image 2612 corresponds to how it is desired to have reference image 2610 constructed by embodiments.

A set of RGB values 2614 is known about reference image 2610. According to a process 2635, which simulates processes according to embodiments, an output test image 2640 is constructed from set of values 2614, and using tentative values for the parameter of the filter function. Process 2635 may include computing additional test values and demosaicking. The additional test values can be demosaicked jointly with the input test values. Output test image 2640 can be constructed from the joint demosaicking.

Output test image 2640 may then be compared to target image 2612, for how close they are, i.e. how well they match. The process may be repeated a number of times, using different parameter values, until they are satisfactorily close. This way, filters are trained, or learned, by minimizing an error, i.e. a difference between constructed output test image 2640 and target image 2612. Sample algorithms for minimizing the error are described later in this document.

In some embodiments, the input test values can be determined by actually exposing a test array to the reference image, and thus capturing an image. The reference image may be a scene printed on a test chart. Preferably, the image of the scene is not overexposed and has low noise.

In such cases, target image 2612 can be obtained by aligning reference image 2610 to the captured image as precisely as possible, anticipating possible geometric distortions that may be present in the test pixel array. Then target image 2612 can be calculated.

In other embodiments, the input test values can be determined by calculating an expected response of the pixels due to exposure to the reference image. This can be implemented in any number of ways.

One such way is to determine a Point Spread Function (PSF). PSF can be measured for a test pixel array. Alternately, a Modulation Transfer Function (MTF) can be measured, to obtain the PSF. If measurement is not possible, the PSF could be estimated for example using lens parameters and known or target sensor PSF, possibly obtained by system simulations.

In such cases, target image 2612 can be simulated by calculating expected response on the construction grid. For example, a high-resolution bitmap image of a natural scene can be taken as the reference image, which is a faithful linear representation of the captured scene. The noise could be low, there could be few or no overexposed areas where RGB values are clipped, and no over-sharpening. If the image had been gamma-corrected, it could be linearized by applying reverse gamma transform. In addition, reverse color correction can be applied, which would correspond to the image's color space. The expected responses at physical photo-sites can be calculated. This can be achieved by applying the PSF obtained from the previous step. The desired responses can be calculated after demosaicking on the image construction grid, to obtain the target image 2612.

FIG. 27 shows a flowchart 2700 for describing filter training methods according to embodiments. The methods of flowchart 2700 may also be practiced by embodiments described above. Or, one or more of the filter functions may have been trained by a separate processor that performs actions. These actions may result in operations such as the below.

According to an operation 2710, input test values can be received for a reference image. The reference image can be reference image 2610, and input test values can be set 2614. The input test values may be determined in any number of ways.

According to another operation 2720, a tentative value is selected for a parameter of the filter function. If this is the first time operation 2720 is performed, the value may be selected by being set tentatively. If this is a subsequent time operation 2720 is performed, the value may be adjusted from what was set tentatively. Adjustment may be further in view of a determination of error in operation 2750.

According to another operation 2730, additional test values can be computed from the input test values about the reference image. The additional test values can be computed using the last time that the tentative value of operation 2720 was executed. In addition, demosaicking can be performed as per the above.

According to another operation 2750, a target version of the reference image may be compared with an output test image. The output test image may have been constructed from the input test values and from the additional test values, such as from operation 2730. Comparing may be performed to see how well there is matching. The extent of matching may be determined by quantifying a difference as an error, as mentioned above, and then trying to minimize the error. If matching is not satisfactory, the execution may continue to operation 2730, and the parameter value may be further adjusted based on the comparison.

Embodiments for minimizing the error are now described.

FIG. 28 shows equations that can be used for training filters for preparing an image with RGB values according to embodiments. In these cases, training will be for direct RGB construction.

Equations 2810 are an over-determined system of linear equations. Training involves error minimization in equations 2810. The values of R*, G*, B* are values from the target image. The vectors shown with a prime, such as H', are the transpose vectors from what would be without the prime, such as H.

The challenge with equations 2810 is that the unknown of interest is H', which is not given analytically. The challenge is met by writing equation 2820 as a synoptic representation of each of equations 2810. Then, equation 2830 displays a way to solve equation 2820 for the value of A. As such, the form of equation 2830 will be used for solving equations 2810 for H'.

Alternately, the training might be solved with fewer computations with embodiments that first compute the luminance chrominance. The below uses concepts already described above with reference to FIGS. 25A-25D.

FIGS. 29A, 29B, 29C, 29D show equations that can be used for training filters first in luminance and chrominance values according to embodiments. The equation of FIG. 29A gives the value of the luminance, at least for a target reference image. The equation of FIG. 29B presents the over-constrained problem that includes the transpose of the luminance filter $H'(p,1)^Y$. Then the luminance filter $H(p,1)^Y$ can be solved, for the filter training. Solving can be done using numerical methods, such as least mean square error.

Then the chrominance filters $H(p,1)^{CR}$, $H(p,1)^{CG}$ and $H(p,1)^{CB}$ can be solved for the filter training. The equations of FIG. 29C are similar to those in FIGS. 25A, 25B, and 25D. The equations of FIG. 29C present the same over-constrained problem as Equations 2810 of FIG. 28, and can be solved similarly.

Additional image operations are now described.

Figure 30:
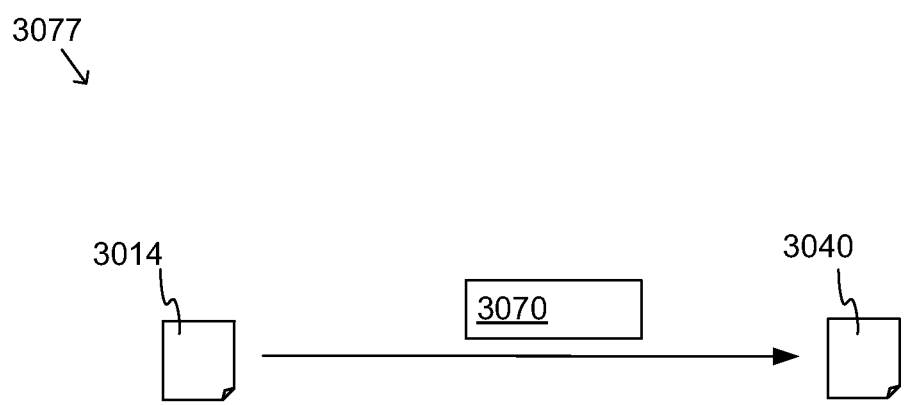
FIG. 30 is a diagram illustrating image operations according to embodiments.

FIG. 30 is a diagram 3077 illustrating sample image operations. An input image 3014 may undergo one or more operations 3070, after which they render an output image 3040. A number of such operations are possible according to embodiments. For example an image can be resized, along with being demosaicked. An example is now described.

Figure 31:
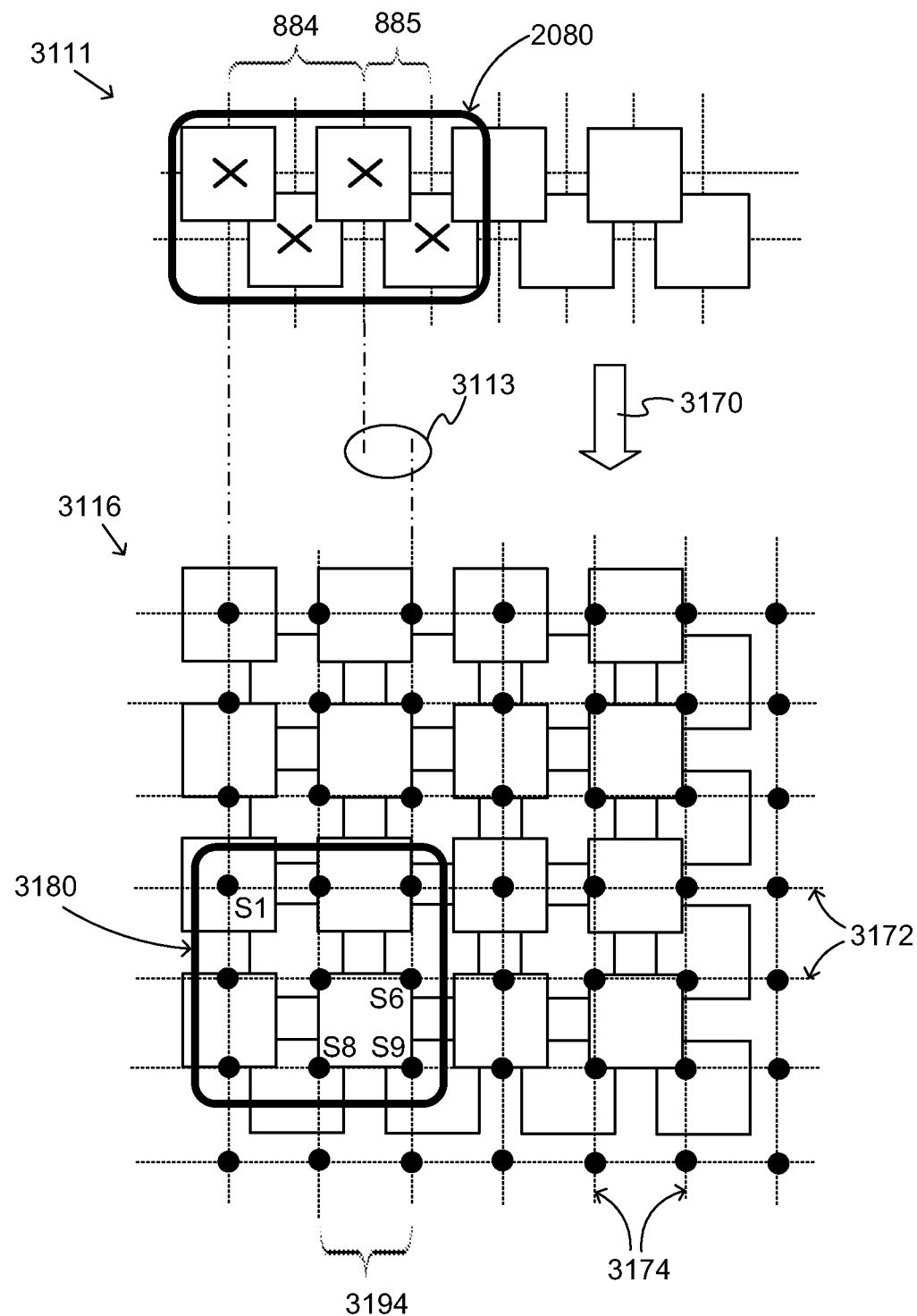
FIG. 31 is a diagram illustrating resizing of an output image from the input image according to embodiments.

FIG. 31 is a diagram illustrating resizing. A portion 3111 of an array is shown, which is a portion of array 811 of FIG. 8. Portion 3111 also shows unit tile 2080, horizontal pixel pitch 884, and horizontal offset distance 885 that is half the size of horizontal pixel pitch 884.

According to a resizing operation 3170, the image can be resized into a new sample image construction grid 3116. Image construction grid 3116 defines locations, marked by dots, at the intersections of new rows 3172 and columns 3174. These new rows and columns give image construction grid

3116 its own pitch, which can be called construction pitch. The construction pitch can be different than the pixel pitch. Being resized, image construction grid 3116 will no longer map into the physical pixels the same way.

More particularly, in portion 3111 the pixel center points are distributed along a certain direction, according to a pixel pitch 884. In FIG. 31 the certain direction is the horizontal direction, but one could be describing equivalently the vertical direction. Plus, in image construction grid 3116, at least some of the additional center points can be distributed along the certain direction according to the construction pitch. Here, the certain direction being the horizontal direction, a construction pitch 3194 in the horizontal direction is larger than physical sampling grid pitch 885. This is indicated by contrasting indication 3113, which contrasts a size of twice pitch 885, namely pixel pitch 884, with a size of twice construction pitch 3194.

In the example of FIG. 31, a new unit tile 3180 is shown, which is also called the resized tile and elementary resized tile. It should be noted that resized tile 3180 is not defined from tile 2080, but it becomes defined from the minimum number of locations or positions that are uniquely positioned on construction grid 3116 with respect to the physical pixel photo-sites. Tile 3180 has nine such locations or positions, shown in dots, for which filter values will need to be computed. Only four locations S1, S6, S8, S9 of the nine are designated, so as not to clutter the drawing.

The expansion from the input image to the output image can be quantified in terms of the horizontal scale ratio, of the horizontal construction pitch divided by the horizontal physical pitch, and the vertical scale ratio, of the vertical construction pitch divided by the vertical physical pitch. The total scale ratio would be the horizontal scale ratio times the vertical scale ratio. A sample such total scale ratio can be about 1.5×.

In fact, in embodiments of resizing, there can be expansion or contraction in the horizontal and the vertical direction concurrently. In the particular case of embodiments, expansion is advantageously possible because additional values can be computed between the captured values. The output image can be resized, in some embodiments, to match the increase in limiting resolution, which can be about 20%.

In embodiments such as that of FIG. 31, where image construction grid 3116 is chosen such that there is a green pixel photo-site at each location, the total scale ratio corresponds to the number of samples in output image/the number of green pixels in the input image. Accordingly, a 2 Megapixel camera could effectively yield an image of a 3 Megapixel camera consistently, with a total scale ratio of about 1.5×. A person skilled in the art will determine what further choices of a construction pitch are advantageous for resizing, given any image construction grid.

Moreover, for each filter location, a kernel will have to be defined as previously for each unique filter location. A filter kernel on image construction grid 3116 is defined around each construction location on image construction grid 3116. It will be observed that values will have to be computed for kernel locations that are not on the physical pixel grid, for example as was indicated in FIG. 23 by additional center point 2339. Filter coefficient locations within kernel H may be enumerated. Coefficients at locations where a physical pixel center is not present can be ignored or set to 0.

The kernel size could be larger, when resize is applied. The larger size may result from trying to match the original kernel size without resize, so as to avoid color aliasing. For example, if 2× downsize is applied horizontally and vertically, the new kernel size with resize could cover 2× more photo-site samples horizontally and vertically. The rest of the algorithm could be as before.

Additional image operations could be implemented, optionally as a single operation with operations described above, as was true for the resizing operation of FIG. 30. Such additional image operations include color correction, denoise and sharpening. These additional image operations also include color space conversion, for example by outputting YUV by linear conversion from RGB, or in reverse. These additional image operations moreover include bad pixel correction, where a sample is reconstructed when missing. Bad pixel correction can then be performed using properly trained kernels. Sample embodiments are now described.

In embodiments, once filters are implemented, further implementing these additional operations as a single operation using the filters may advantageously remove the need for including separate processing stages for these additional operations. Indeed, these additional operations can be implemented as variations in the values of the already implemented filters, from what these values would be. Moreover, such can be even customized to particular components of an imaging device, such as imaging device 100.

Figure 32:
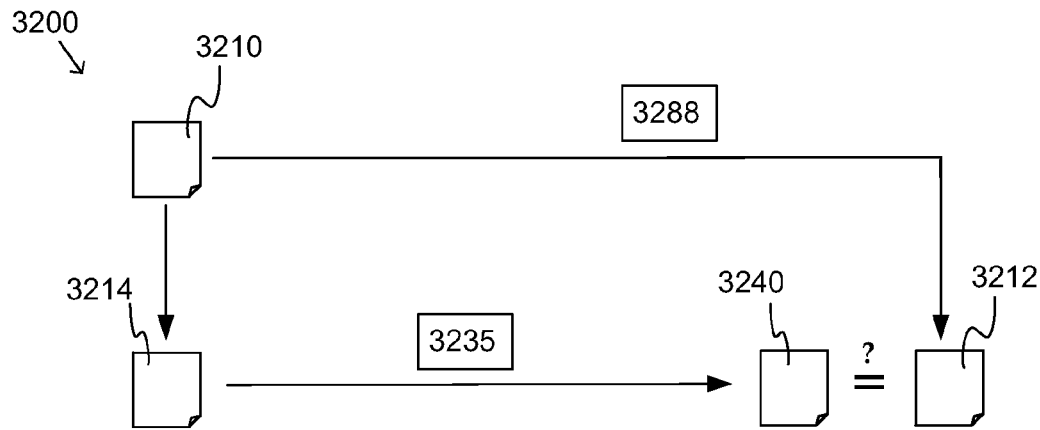
FIG. 32 is a diagram illustrating additional composite image operations according to embodiments.

FIG. 32 is a diagram 3200 for describing filter training operations according to embodiments, similarly with those of FIG. 26. A reference image 3210 can be selected, similarly with reference image 2610.

A target image 3212 can derived from selected reference image 3210. Target image 3212 can also be thought of as a target version of reference image 3210. Target image 3212 corresponds to how it is desired to have reference image 3210 constructed by embodiments. Derivation can be twofold. Initial derivation can be as described earlier in this document. Beyond that, derivation includes applying one or more desired additional image operations 3288 on reference image 3210, so as to derive target image 3212. Additional image operation 3288 can include one or more of color correction, denoise, sharpening, color space conversion, bad pixel correction, resize, etc.

According to a process 3235, which simulates processes according to embodiments, an output test image 3240 is constructed from set of values 3214, and using tentative values for the parameter of the filter function. Process 3235 may include computing additional test values and demosaicking, similarly with process 2625.

Output test image 3240 may then be compared to target image 3212, for how close they are. The process may be repeated a number of times, using different parameter values, until they are satisfactorily close. This way, filters are trained, or learned, by minimizing the error between constructed output test image 3240 and target image 3212, as above. Accordingly, the filters within process 3235 will be trained to perform also desired additional image operation 3288.

Customizations can be further added to additional image operation 3288 according to embodiments. For example, there can be customization for construction vs. pixel array location, lens zoom position, focus position. As such, customization could be for each manufactured camera module for calibration purposes; such camera modules could provide the test arrays. A camera PSF/MTF varies with respect to pixel array location (center or periphery), lens zoom and focus portion, individual module characteristics, etc. These customizations can help attain better image quality, by considering and compensating these PSF/MTF variations. Additional sets of filters can be trained for each configuration, while only one set of filters could be applied for the final image each time.

Additional image operation 3288 can have further uses according to embodiments. Filters can be trained, so that other color configurations can also be utilized. These other color configurations can include scenarios with other than three color channels, such as monochrome, RGBW (RGB+ white), etc.

A challenge is that, although color correction can be combined with demosaicking (and sharpening), sometimes color correction requires non-linear processing. As such, color correction sometimes cannot be done jointly with demosaicking. In cases when sharpening is applied after color correction, sharpening could be disjoint from demosaicking, and more stages may be required.

Figure 33:
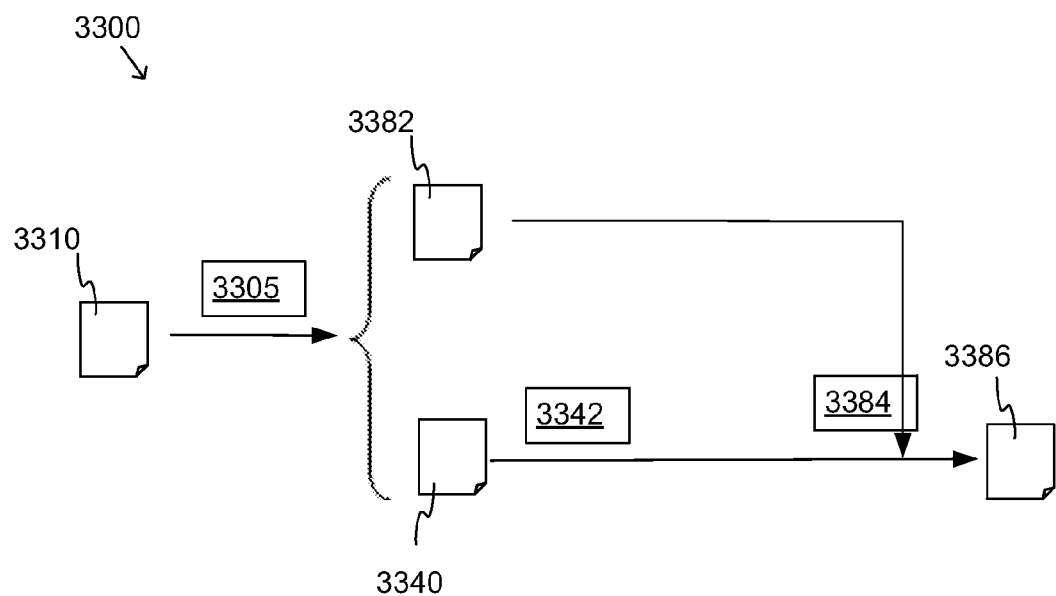
FIG. 33 is a diagram illustrating a specific composite image operation according to embodiments.

FIG. 33 is a diagram illustrating a specific composite image operation 3300. A joint demosaicking and sharpening signal operation 3305 is applied to an input image 3310. One of the results is a reconstructed image 3340 that includes RGB values, and another is a sharpening signal 3382 that includes S values indicating a magnitude of the sharpening signal. More particularly, a filter may be added for each location. This filter can be trained to generate a sharpening signal by providing a (simulated) target image for sharpening signal. As such the sharpening signal is added to image after color correction to obtain the sharpened image in this embodiment. A color correction operation 3342 can then be applied to reconstructed image 3340, and then a sharpening operation 3384 applies sharpening signal 3382, so that reconstructed image 3340 becomes final output image 3386.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, device or method.

This description includes one or more examples, but that does not limit how the invention may be practiced. Indeed, examples or embodiments of the invention may be practiced according to what is described, or yet differently, and also in conjunction with other present or future technologies.

Reference to any prior art in this specification is not, and should not be taken as, an acknowledgement or any form of suggestion that this prior art forms parts of the common general knowledge in any country.

A person skilled in the art will be able to practice the present invention in view of this description, which is to be taken as a whole. Details have been included to provide a thorough understanding. In other instances, well-known aspects have not been described, in order to not obscure unnecessarily the present invention.

Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the advantages of the features incorporated in such combinations and sub-combinations.

The following claims define certain combinations and sub-combinations of elements, features and steps or operations, which are regarded as novel and non-obvious. Additional claims for other such combinations and subcombinations may be presented in this or a related document.

What is claimed is:

1. An imaging device, comprising:
an array having a plurality of pixels configured to capture respective values for a single input image, each captured value corresponding to a pixel center point of a plurality of pixel center points for the plurality of pixels;
a processor configured to compute from the captured values additional values for the single input image, at least some of the additional values corresponding to additional center points that are different from any of the pixel center points; and
one or more memories configured to store the captured values and the additional values.

2. The device of claim 1, in which
the additional values are further merged with the captured values when stored.

3. The device of claim 1, further comprising:
a display configured to display an output image constructed from both the captured values and from the additional values.

4. The device of claim 3, in which
the additional values are demosaicked jointly with the captured values, and
the output image is constructed from the joint demosaicking.

5. The device of claim 1, in which
substantially identical tiles are defined from the pixel center points, and
one or more of the additional values that corresponds to one of the additional center points within selected tiles is computed from one of the captured values within the certain tile and from one of the captured values outside the certain tile.

6. The device of claim 1, in which
a sum of a number of the captured values plus a number of the additional values is greater than a number of the pixels in the array.

7. The device of claim 1, in which
the pixels of the array are arranged in at least a lower layer and in an upper layer that is vertically stacked over the lower layer, and
the pixel center points are defined as pixel center points for the pixels in the upper layer plus pixel center points for projections of the pixels in the lower layer onto a plane of the upper layer.

8. The device of claim 1, further comprising:
a display configured to display an output image constructed from both the captured values and from the additional values.

9. The device of claim 8, in which
the additional values are demosaicked jointly with the captured values, and
the output image is constructed from the joint demosaicking.

10. The device of claim 1, in which
the additional values are computed using a filter function.

11. The device of claim 10, in which
the filter function has been determined by a processor performing actions resulting in operations comprising:
receiving input test values for a reference image;
selecting a tentative value for a parameter of the filter function;

computing, from the input test values, additional test values about the reference image using the tentative value; and adjusting the parameter value.

12. The device of claim 11, in which
the input test values have been determined by exposing a test pixel array to the reference image.

13. The device of claim 11, in which
the input test values have been determined by calculating an expected response of the pixels due to exposure the reference image.

14. The device of claim 11, in which
the parameter of the filter function is one of a size of the filter, and a weight coefficient of the filter.

15. The device of claim 11, in which
a target version of the reference image is compared with an output test image constructed from the input test values and from the additional test values, and the parameter value is adjusted based on the comparison.

16. The device of claim 15, in which
the additional test values are demosaicked jointly with the input test values, and the output test image is constructed from the joint demosaicking.

17. The device of claim 15, in which
an additional image operation has been performed on the reference image to derive the target version of the reference image.

18. The device of claim 1, in which
the pixel center points are distributed along a certain direction according to a pixel pitch, and at least some of the additional center points are distributed along the certain direction according to a construction pitch that is different than the pixel pitch.

19. An imaging device, comprising:
an array having a plurality of pixels configured to capture respective values for a single input image, each captured value corresponding to a pixel center point of a plurality of pixel center points;

a processor configured to compute from the captured values additional values for the single input image, at least some of the additional values corresponding to additional center points that are different from the plurality of pixel center points; and a display configured to display an output image constructed from the captured values and from the additional values.

20. A computer comprising: a processor and a memory coupled with the processor, the memory storing one or more programs which, when executed by the processor, result in:
receiving captured values for a single input image, each captured value corresponding to a pixel center point of a plurality of pixel center points;

computing from the captured values additional values for the single input image, at least some of the additional values corresponding to additional center points that are different from the plurality of pixel center points; and causing the captured values and the additional values to be stored in one or more memories.

21. A method, comprising:
receiving captured values for a single input image, each captured value corresponding to pixel center point of a plurality of pixel center points;

computing from the captured values additional values for the single input image, at least some of the additional values corresponding to additional center points that are different from the plurality of pixel center points; and causing the captured values and the additional values to be stored in one or more memories.

22. A method for an imaging device comprising an array of pixels at respective pixel center points of the array, a processor and a display, the method comprising:
capturing values for a single input image in a plurality of the pixels, each captured value corresponding to a pixel center points;

computing from the captured values additional values for the single input image, at least some of the additional values corresponding to additional center points that are different from the plurality of pixel center points; and displaying an output image constructed from the captured values and from the additional values.

23. A method for an imaging device comprising an array of pixels at respective pixel center points of the array, a processor and one or more memories, the method comprising:
capturing values for elements of a single input image in a plurality of the pixels, each captured value corresponding to pixel center point of a plurality of pixel center points;

computing by the processor additional values from the captured values for the single input image, at least some of the additional values corresponding to additional center points that are different from the plurality of pixel center points; and storing the captured values and the additional values in the one or more memories.

* * * * *